US012689748B2

(12) United States Patent
Zhou et al.

(10) Patent No.: US 12,689,748 B2
(45) Date of Patent: Jul. 21, 2026

(54) METHOD AND APPARATUS FOR VIDEO PROCESSING, AND STORAGE MEDIUM AND ELECTRONIC APPARATUS

(71) Applicant: ZTE Corporation, Shenzhen (CN)

(72) Inventors: Yi Zhou, Shenzhen (CN); Wenjie Zou, Shenzhen (CN); Cheng Huang, Shenzhen (CN); Yaxian Bai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/652,790

(22) Filed: May 1, 2024

(65) Prior Publication Data

US 2024/0283951 A1      Aug. 22, 2024

Related U.S. Application Data

(63) Continuation of application No. PCT/CN2022/134125, filed on Nov. 24, 2022.

(30) Foreign Application Priority Data

Dec. 31, 2021    (CN) .......................... 202111679995.5

(51) Int. Cl.
*H04N 19/186*        (2014.01)
*H04N 19/117*        (2014.01)
(Continued)

(52) U.S. Cl.
CPC ......... *H04N 19/186* (2014.11); *H04N 19/117* (2014.11); *H04N 19/154* (2014.11); *H04N 19/82* (2014.11)

(58) Field of Classification Search
CPC .......................... H04N 19/186; H04N 19/117
(Continued)

(56) References Cited

U.S. PATENT DOCUMENTS 11,196,992 B2     12/2021  Huang et al.
2013/0259118 A1   10/2013  Fu et al.
(Continued)

FOREIGN PATENT DOCUMENTS

CN            106028050 A      10/2016
CN            107925762 A       4/2018
(Continued)

OTHER PUBLICATIONS

International Search Report and Written Opinion for International Application No. PCT/CN2022/134125, mailed on Jan. 12, 2023, 8 pages with English translation.
(Continued)

*Primary Examiner* — Amir Shahnami
(74) *Attorney, Agent, or Firm* — Perkins Coie LLP

(57)                ABSTRACT

Embodiments of the present disclosure provide a method and an apparatus for video processing, and a storage medium and an electronic apparatus. The method comprises: determining a neural network loop filtering enabled flag of a reconstructed video unit; setting, based on the neural network loop filtering enabled flag, an adaptive loop filtering enabled flag for the reconstructed video unit; and signaling at least one type of the following information: filter information related to neural network loop filter of the reconstructed video unit, and filter information related to adaptive loop filter of the reconstructed video unit.

19 Claims, 6 Drawing Sheets

(51) Int. Cl.
    *H04N 19/154*       (2014.01)
    *H04N 19/82*        (2014.01)

(58) Field of Classification Search
    USPC ..................................................... 375/240.02
    See application file for complete search history.

(56)           References Cited

U.S. PATENT DOCUMENTS

| | | | |
|---|---|---|---|
| 2019/0273948 A1 | 9/2019 | Yin et al. | |
| 2021/0099710 A1* | 4/2021 | Salehifar .............. | G06N 3/0464 |
| 2021/0400311 A1 | 12/2021 | Hsiao et al. | |
| 2021/0409783 A1 | 12/2021 | Wan et al. | |
| 2022/0295116 A1* | 9/2022 | Ma ........................ | H04N 19/117 |
| 2025/0008162 A1* | 1/2025 | Takada ................... | H04N 19/70 |

FOREIGN PATENT DOCUMENTS

| | | | |
|---|---|---|---|
| CN | 112997504 A | 6/2021 | |
| JP | 2014-533012 A | 12/2014 | |
| JP | 2019-201256 A | 11/2019 | |
| WO | 2012155553 A1 | 11/2012 | |
| WO | 2020094153 A1 | 5/2020 | |
| WO | 2021051369 A1 | 3/2021 | |

OTHER PUBLICATIONS

European Search Report issued in EP Patent Application No. 22913931.6, dated Jan. 2, 2025, 13 pages.

Chuanmin et al., "Content-Aware Convolutional Neural Network for In-Loop Filtering in High Efficiency Video Coding," IEEE Transactions on Image Processing, vol. 28, No. 7, Jul. 2019, pp. 3343-3356, 14 pages.

Choi et al., "AHG9/AHG11: SEI message for carriage of neural network information for post filtering," Joint Video Experts Team (JVET) of ITU-T SG 16 WP 3 and ISO/IEC JTC 1/SC 29, Document: JVET-U0091-v3, 21st Meeting, by teleconference, Jan. 6-15, 2021, 13 pages.

Bordes et al., "HLS for ALF parameters for RPR," Joint Video Experts Team (JVET) of ITU-T SG 16 WP 3 and ISO/IEC JTC 1/SC 29, Document: JVET-W0074, 23rd Meeting, by teleconference, Jul. 7-16, 2021, 7 pages.

Zou et al., "AHG11: ALF improvement for NNVC," Joint Video Exploration Team (JVET) of ITU-T SG 16 WP 3 and ISO/IEC JTC 1/SC 29, Document: JVET-Y0046-v1, 25th Meeting, by teleconference, Jan. 12-21, 2022, 5 pages.

Zou et al., "AHG11: ALF-SPLIT for NCS2.0," Joint Video Experts Team (JVET) of ITU-T SG 16 WP 3 and ISO/IEC JTC 1/SC 29, Document: JVET-AB0108-v1, 28th Meeting, Mainz, DE, Oct. 20-28, 2022, 5 pages.

Korean office action issued in KR Patent Application No. 10-2024-7011368, dated Feb. 20, 2025, 10 pages. English translation included.

Japanese office action issued in JP Patent Application No. 2023-578160, dated Jan. 21, 2025, 6 pages. English translation included.

\* cited by examiner

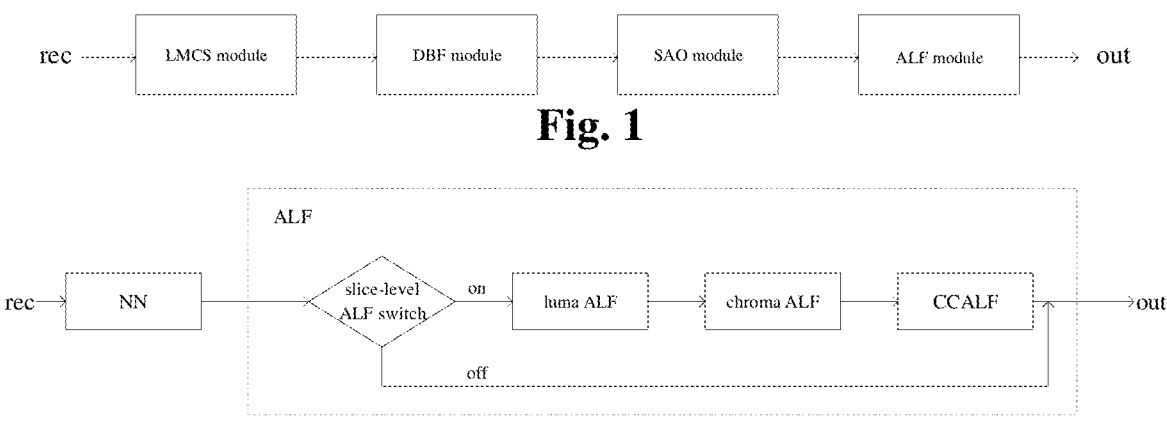
Fig. 1
Fig. 2
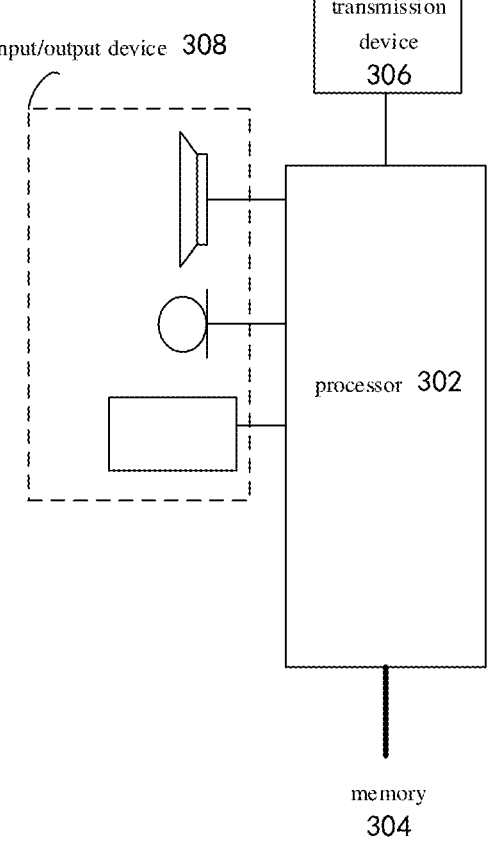
Fig. 3

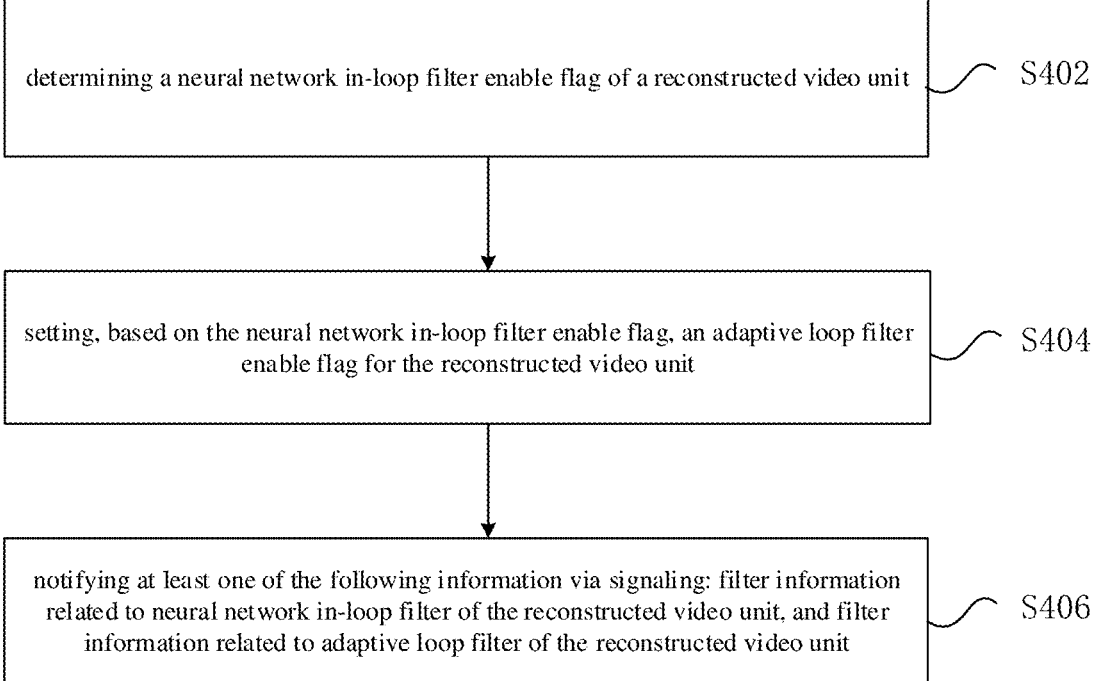

determining a neural network in-loop filter enable flag of a reconstructed video unit        S402 setting, based on the neural network in-loop filter enable flag, an adaptive loop filter enable flag for the reconstructed video unit        S404 notifying at least one of the following information via signaling: filter information related to neural network in-loop filter of the reconstructed video unit, and filter information related to adaptive loop filter of the reconstructed video unit        S406

Fig. 4

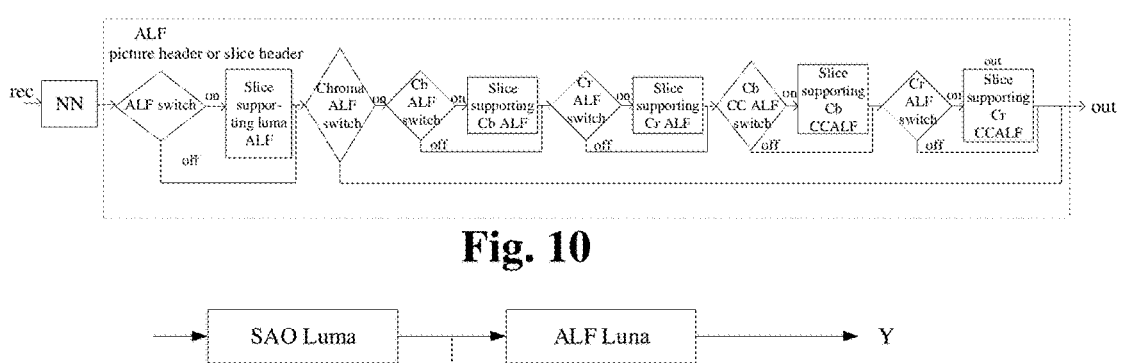

Fig. 10

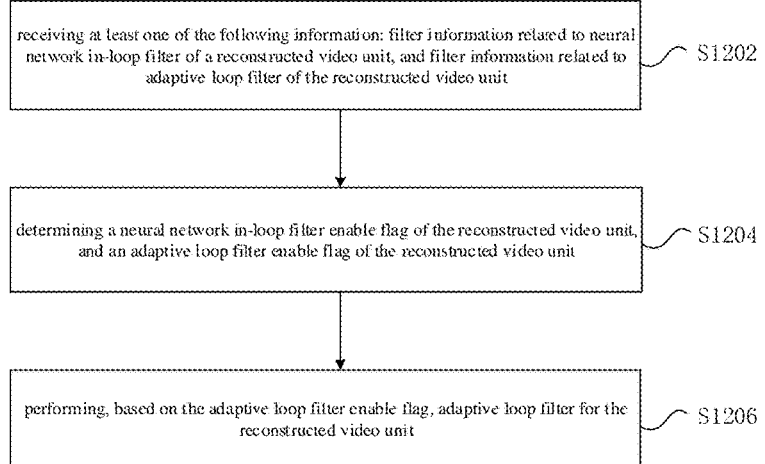

Fig. 11 receiving at least one of the following information: filter information related to neural network in-loop filter of a reconstructed video unit, and filter information related to adaptive loop filter of the reconstructed video unit ⟍ S1202 determining a neural network in-loop filter enable flag of the reconstructed video unit, and an adaptive loop filter enable flag of the reconstructed video unit ⟍ S1204 performing, based on the adaptive loop filter enable flag, adaptive loop filter for the reconstructed video unit ⟍ S1206

Fig. 12

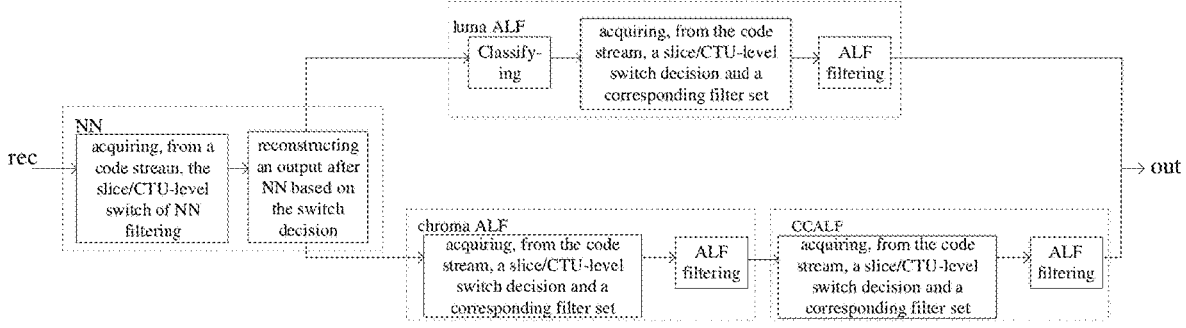

Fig. 13

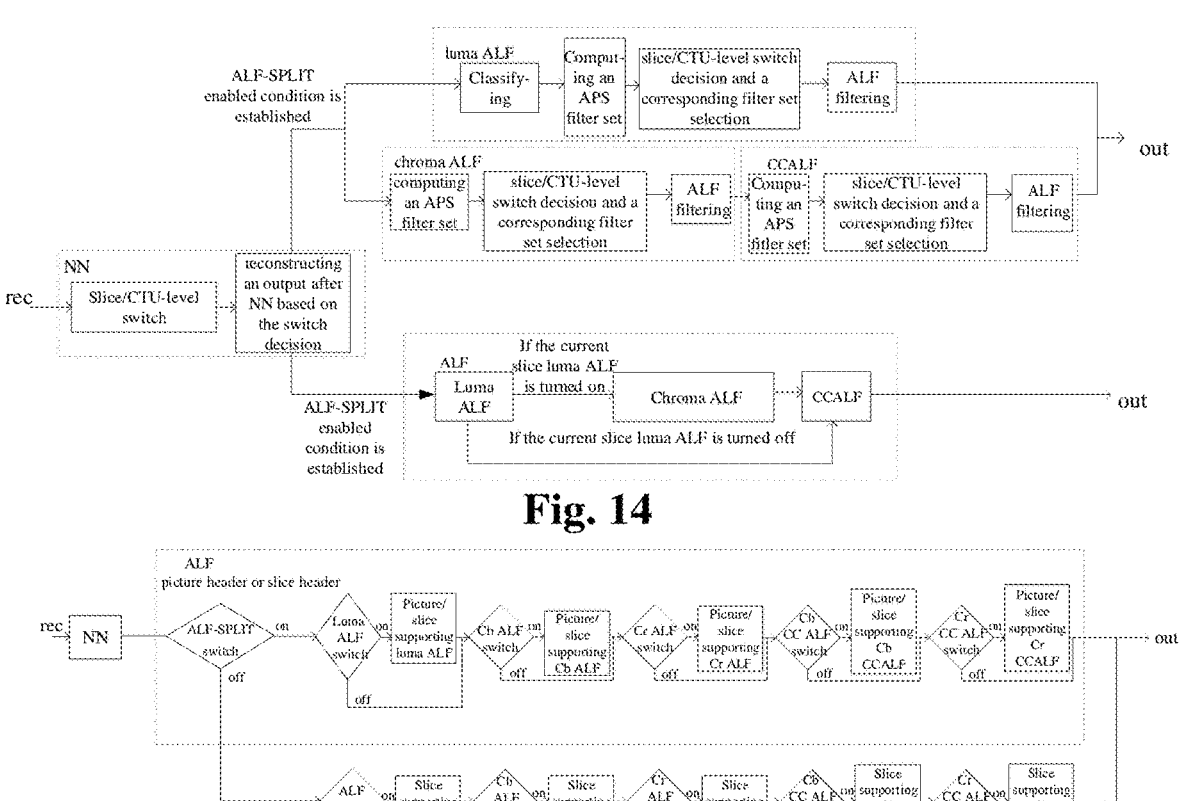
Fig. 14
Fig. 15
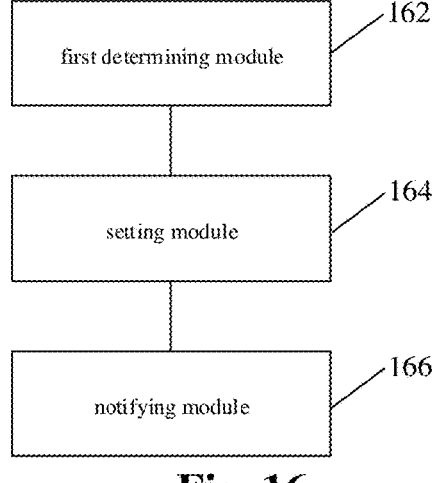
Fig. 16

METHOD AND APPARATUS FOR VIDEO PROCESSING, AND STORAGE MEDIUM AND ELECTRONIC APPARATUS

CROSS-REFERENCE TO RELATED APPLICATION(S)

This application is a continuation of International Patent Application No. PCT/CN2022/134125, filed on Nov. 24, 2022, which claims priority to Chinese Patent Application No. 202111679995.5, filed on Dec. 31, 2021. The entire contents of the before-mentioned patent applications are incorporated by reference as part of the disclosure of this application.

TECHNICAL FIELD

Embodiments of the present disclosure relate to the communication field, and specifically to a method and an apparatus for video processing, and a storage medium and an electronic apparatus.

BACKGROUND

There is a tendency to apply the machine learning technology represented by the Neural Network (NN) to image/video coding, where a nonlinear mapping relationship from the distortion domain to the original/lossless domain is established based on the Neural Network In-loop Filter (NNF) so that the quality of the reconstructed video can be greatly improved.

Because of nonlinearity of NNF network training, generally, an Adaptive Loop Filter (ALF) filter is still used after the NNF to further improve the performance of the coded image. For the luma component of the video, the NNF can attain the optimal performance. When an ALF module makes a decision selection at a slice level, if determining is performed only based on the rate distortion optimized performance of the luma component, there is a possibility of turning off the ALF module. Further, as the NNF of the chroma component is not optimal in most cases, it is required to perform the chroma ALF and Cross-component Adaptive Loop Filter (CCALF) to achieve a better performance for the chroma component.

However, in the current ALF technology, directly using the ALF module after NNF may cause the following problems:

If the optimal performance can be attained for the slice-level luma component after NNF, i.e., the ALF cannot attain any improvement any longer in terms of luma component, the luma ALF of the current slice level will be set to an off state. However, once the ALF is turned off based on the luma performance, the chroma ALF and CCALF are also forcibly turned off, and the ALF filtering operation for the chroma will not be performed. If the ALF filtering is not performed for the chroma component after the NNF, more deviations from original values may be introduced, causing a failure to obtain the best image quality.

For the problem of the poor image quality after processing in the related technologies, there still lacks an effective solution currently.

SUMMARY

The embodiments of the present disclosure provide a method and an apparatus for video processing, a storage medium and an electronic apparatus, to at least solve the problem of the poor image quality after processing in the related technologies.

According to an embodiment of the present disclosure, there is provided a method for video processing, comprising: determining a neural network in-loop filter enabled flag of a reconstructed video unit; setting, based on the neural network in-loop filter enabled flag, an adaptive loop filter enabled flag for the reconstructed video unit; and notifying at least one of the following information via signaling: filter information related to neural network in-loop filter of the reconstructed video unit, and filter information related to adaptive loop filter of the reconstructed video unit.

In an alternative embodiment, the filter information related to the adaptive loop filter comprises the adaptive loop filter enabled flag, and an adaptive parameter set referenced by the adaptive loop filter.

In an alternative embodiment, the adaptive loop filter enabled flag comprises a luma adaptive loop filter enabled flag, and a chroma adaptive loop filter enabled flag.

In an alternative embodiment, the chroma adaptive loop filter enabled flag comprises at least one of the following: a first chroma adaptive loop filter enabled flag; a second chroma adaptive loop filter enabled flag; a first chroma cross-component adaptive loop filter enabled flag; or a second chroma cross-component adaptive loop filter enabled flag.

In an alternative embodiment, the adaptive loop filter enabled flag is notified, via signaling, in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

In an alternative embodiment, the method further comprises: in a case where the neural network in-loop filter enabled flag indicates, at a sequence level, picture level or slice level, that the neural network in-loop filter is performed for the reconstructed video unit, setting a luma adaptive loop filter enabled flag and a chroma adaptive loop filter enabled flag for the reconstructed video unit, respectively.

In an alternative embodiment, the method further comprises: in a case where the neutral network in-loop filter enabled flag indicates, at a sequence level, to perform the neural network in-loop filter for the reconstructed video unit, and the adaptive loop filter enabled flag indicates, at a picture level or slice layer, not to perform luma adaptive loop filter for the reconstructed video unit, setting a luma adaptive loop filter enabled flag and a chroma adaptive loop filter enabled flag for the reconstructed video unit, respectively.

In an alternative embodiment, the method further comprises: determining, based on the chroma adaptive loop filter enabled flag, whether to perform chroma adaptive loop filter for the reconstructed video unit.

In an alternative embodiment, setting the luma adaptive loop filter enabled flag and the chroma adaptive loop filter enabled flag for the reconstructed video unit, respectively, comprises: setting a first flag associated with an adaptive loop filter of a luma component for the reconstructed video unit.

In an alternative embodiment, setting the luma adaptive loop filter enabled flag and the chroma adaptive loop filter enabled flag for the reconstructed video unit, respectively, comprises: setting a second flag associated with an adaptive loop filter of a chroma component for the reconstructed video unit.

In an alternative embodiment, in a case where the adaptive loop filter enabled flag is valued to a first value, the adaptive loop filter enabled flag is used to indicate to perform the adaptive loop filter for the reconstructed video unit; in a case where the adaptive loop filter enabled flag is valued to a second value, the adaptive loop filter enabled flag is used to indicate not to perform the adaptive loop filter for the reconstructed video unit; wherein the first value and the second value are different.

In an alternative embodiment, performing the adaptive loop filter for the reconstructed video unit comprises at least one of the following operations: performing luma adaptive loop filter for a luma component of the reconstructed video unit; performing first chroma adaptive loop filter for a first chroma component of the reconstructed video unit; performing second chroma adaptive loop filter for a second chroma component of the reconstructed video unit; performing first chroma cross-component adaptive loop filter for a first chroma component of the reconstructed video unit; or performing first chroma cross-component adaptive loop filter for a second chroma component of the reconstructed video unit.

In an alternative embodiment, in a case where the neural network in-loop filter enabled flag indicates, at a sequence level, picture level or slice level, to perform the neural network in-loop filter enabled flag for the reconstructed video unit, setting an adaptive loop filter enabled flag for the reconstructed video unit based on at least one of the following decisions: a decision for performing luma adaptive loop filter for a luma component for the reconstructed video unit; a decision for performing first chroma adaptive loop filter for a first chroma component of the reconstructed video unit; a decision for performing second chroma adaptive loop filter for a second chroma component of the reconstructed video unit; a decision for performing first chroma cross-component adaptive loop filter for a first chroma component of the reconstructed video unit; and a decision for performing first chroma cross-component adaptive loop filter for a second chroma component of the reconstructed video unit.

In an alternative embodiment, the filter information related to the neural network in-loop filter comprises the neural network in-loop filter enabled flag and an adaptive parameter set referenced by the neural network in-loop filter.

In an alternative embodiment, the neural network in-loop filter enabled flag comprises at least one of: a luma neural network in-loop filter enabled flag; a first chroma neural network in-loop filter enabled flag; or a second chroma neural network in-loop filter enabled flag.

In an alternative embodiment, the neural network in-loop filter enabled flag is notified, via signaling, in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

In an alternative embodiment, the reconstructed video unit corresponds to at least one of the following: a video picture, a video slice, a video pattern block, a slice, a codec tree unit CTU, or a codec unit CU.

According to another embodiment of the present disclosure, there is also provided a method for video processing, comprising: receiving at least one of the following information: the filter information related to neural network in-loop filter of the reconstructed video unit, or the filter information related to adaptive loop filter of the reconstructed video unit; determining the neural network in-loop filter enabled flag of the reconstructed video unit and the adaptive loop filter enabled flag of the reconstructed video unit; and performing, based on the adaptive loop filter enabled flag, adaptive loop filter for the reconstructed video unit.

In an alternative embodiment, the filter information related to the adaptive loop filter comprises the adaptive loop filter enabled flag, and an adaptive parameter set referenced by the adaptive loop filter.

In an alternative embodiment, the adaptive loop filter enabled flag comprises a luma adaptive loop filter enabled flag and a chroma adaptive loop filter enabled flag.

In an alternative embodiment, the chroma adaptive loop filter enabled flag comprises at least one of the following: a first chroma adaptive loop filter enabled flag; a second chroma adaptive loop filter enabled flag; a first chroma cross-component adaptive loop filter enabled flag; or a second chroma cross-component adaptive loop filter enabled flag.

In an alternative embodiment, the adaptive loop filter enabled flag is determined in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

In an alternative embodiment, the method further comprises: in a case where the neural network in-loop filter enabled flag indicates, at a sequence level, picture level or slice level, that the neural network in-loop filter is performed for the reconstructed video unit, determining a luma adaptive loop filter enabled flag and a chroma adaptive loop filter enabled flag for the reconstructed video unit, respectively.

In an alternative embodiment, the method further comprises: in a case where the neutral network in-loop filter enabled flag indicates, at a sequence level, to perform neural network in-loop filter for the reconstructed video unit, determining, at a picture level or slice level, a luma adaptive loop filter enabled flag; in a case where the luma adaptive loop filter enabled flag indicates not to perform luma adaptive loop filter is not performed for the reconstructed video unit, determining a chroma adaptive loop filter enabled flag for the reconstructed video unit.

In an alternative embodiment, the method further comprises: determining, based on the chroma adaptive loop filter enabled flag, whether to perform chroma adaptive loop filter for the reconstructed video unit.

In an alternative embodiment, determining the luma adaptive loop filter enabled flag of the reconstructed video unit comprises: determining a value of a first flag of the reconstructed video unit associated with an adaptive loop filter of a luma component.

In an alternative embodiment, determining the chroma adaptive loop filter enabled flag of the reconstructed video unit comprises: determining a value of a second flag of the reconstructed video unit associated with an adaptive loop filter of a chroma component.

In an alternative embodiment, in a case where the adaptive loop filter enabled flag is valued to a first value, the adaptive loop filter enabled flag is used to indicate to perform the adaptive loop filter for the reconstructed video unit; in a case where the adaptive loop filter enabled flag is valued to a second value, the adaptive loop filter enabled flag is used to indicate not to perform the adaptive loop filter for the reconstructed video unit; wherein the first value and the second value are different.

In an alternative embodiment, performing the adaptive loop filter for the reconstructed video unit comprises at least one of the following operations: performing luma adaptive loop filter for a luma component of the reconstructed video unit; performing first chroma adaptive loop filter for a first chroma component of the reconstructed video unit; performing second chroma adaptive loop filter for a second chroma component of the reconstructed video unit; performing first chroma cross-component adaptive loop filter for a first chroma component of the reconstructed video unit; or performing second chroma cross-component adaptive loop filter for a second chroma component of the reconstructed video unit.

In an alternative embodiment, the filter information related to the neural network in-loop filter comprises a neural network in-loop filter enabled flag and an adaptive parameter set referenced by the neural network in-loop filter.

In an alternative embodiment, the neural network in-loop filter enabled flag comprises at least one of: a luma neural network in-loop filter enabled flag; a first chroma neural network in-loop filter enabled flag; or a second chroma neural network in-loop filter enabled flag.

In an alternative embodiment, the neural network in-loop filter enabled flag is determined in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

In an alternative embodiment, the reconstructed video unit corresponds to at least one of the following: a video picture, a video slice, a video picture block, a slice, a codec tree unit CTU, or a codec unit CU.

According to a further embodiment of the present disclosure, there is also provided an apparatus for video processing, comprising: a determining module configured to determine a neural network in-loop filter enabled flag of a reconstructed video unit; a setting module configured to set, based on the neural network in-loop filter enabled flag, an adaptive loop filter enabled flag for the reconstructed video unit; and a notifying module configured to notify, via signaling, at least one of the following information: filter information related to neural network in-loop filter of the reconstructed video unit or filter information related to adaptive loop filter of the reconstructed video unit.

In an alternative embodiment, the filter information related to the adaptive loop filter comprises the adaptive loop filter enabled flag and an adaptive parameter set referenced by the adaptive loop filter.

In an alternative embodiment, the notifying module comprises: a notifying unit configured to notify, via signaling, the adaptive loop filter enabled flag in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

According to a further embodiment of the present disclosure, there is also provided an apparatus for video processing, comprising: a receiving module configured to receive at least one of the following information: filter information related to neural network in-loop filter of a reconstructed video unit and filter information related to adaptive loop filter of the reconstructed video unit; an identifying module configured to identify an adaptive loop filter enabled flag for the reconstructed video unit in a case where a neural network in-loop filter enabled flag indicates to perform neural network in-loop filter for the reconstructed video unit; and a filtering module configured to perform, based on the adaptive loop filter enabled flag, adaptive loop filter for the reconstructed video unit.

In an alternative embodiment, the filter information related to the adaptive loop filter comprises an adaptive loop filter enabled flag and an adaptive parameter set APS referenced by the adaptive loop filter.

In an alternative embodiment, the identifying module comprises: an identifying unit configured to determine the adaptive loop filter enabled flag in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

According to a still further embodiment of the present disclosure, there is also provided a computer readable storage medium having a computer program stored therein, which is configured to, when executed, perform any one of method embodiments as described above.

According to a still further embodiment of the present disclosure, there is also provided an electronic apparatus comprising a memory, a processor, and a computer program stored on the memory, wherein the processor is configured to, when executes the computer program, perform any one of method embodiments as described above.

BRIEF DESCRIPTION OF THE DRAWINGS

FIG. 1 illustrates an H.266/VVC loop filter process according to the related technologies;

FIG. 2 illustrates a schematic diagram of NN filtering and ALF according to the related technologies;

FIG. 3 illustrates a block diagram of a hardware structure of a mobile terminal of a method of video processing according to embodiments of the present disclosure;

FIG. 4 illustrates a flowchart I of a method for video processing according to embodiments of the present disclosure;

FIG. 10 illustrates a flowchart of transmission of a picture/slice layer after a chroma switch is added according to embodiments of the present disclosure;

FIG. 11 illustrates a block diagram of ALF containing CC-ALF according to embodiments of the present disclosure;

FIG. 12 illustrates a flowchart II of a method for video processing according to embodiments of the present disclosure;

FIG. 13 illustrates a flowchart of an NN filtering-based ALF-SPLIT operation at a decoding side according to embodiments of the present disclosure;

FIG. 14 illustrates a flowchart of an NN filtering-based ALF-SPLIT operation at an encoding side according to embodiments of the present disclosure;

FIG. 15 illustrates a flowchart of transmission of a picture/slice layer after an ALF-SPLIT switch is added according to a specific embodiment of the present disclosure;

FIG. 16 illustrates a block diagram of a structure of an apparatus for video processing according to embodiments of the present disclosure.

DETAILED DESCRIPTION OF EMBODIMENTS

Figure 5:
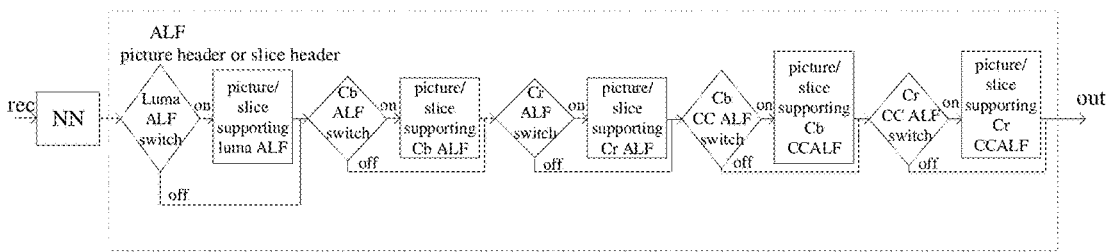
FIG. 5 illustrates a flowchart of transmission of a picture/slice layer after a luma switch is added according to embodiments of the present disclosure.

Reference will now be made to drawings to describe in detail the embodiments of the present disclosure hereinafter.

It is worth noting that the terms "first," "second," and the like in the description and the claims, as well as in the drawings, if any, are used for distinguishing similar elements and not necessarily for describing a particular sequential or chronological order.

First of all, the related technologies of the present disclosure are described:

The new generation video coding standard H.266/VVC (Versatile Video Coding, another name for H.266) employs the block-based hybrid coding framework, and the distortion effects such as blocking effect, ring effect, color deviation, image blur, and the like, are still present in a compressed video according to the H.266/VVC standard. In order to reduce the impact of such distortion on video quality, the In-loop filtering technology is used in the H.266/VVC, including Luma Mapping With Chroma Scaling (LMCS), Deblocking Filter (DBF), Sample Adaptive Offset (SAO), and Adaptive Loop Filter (ALF). LMCS improves the compression efficiency by redistributing code words to information within a dynamic range; DBF is used to reduce the blocking effect; SAO is used to improve the ringing effect; the ALF can reduce decoding errors. The H.266/VVC in-loop filter process is shown in FIG. 1 that illustrates an in-loop filter process following the H.266/VVC standard according to the related technologies. After the H.266/VCC was published, NN-based video coding is a research hot topic of the next generation video coding. Wherein, in the in-loop filter, the NN filtering module may be added as a new module into the in-loop filter, and may substitute for the original DBF and SAO modules, to thus save the transmission overhead while improve image quality. In general, in the codec, the ALF filter is still used after performing the NN-based filtering, to further improve the image performance. Details are shown in FIG. 2 where is provided a "slice-level ALF switch" mainly used for controlling whether a luma ALF of the current slice is to be turned on. FIG. 2 illustrates a schematic diagram of NN filtering and ALF according to the related technologies.

According to an embodiment of the present disclosure, the encoding side performs the following operations:

(1) If a sequence parameter set (SPS)-layer NN filtering is turned on, performing NN filtering for a reconstructed picture after LMCS according to the following operations a-c; if it is turned on, performing filtering according to the legacy filtering process (DBF, SAO):

a. pre-performing NN filtering;

b. making a slice/block (a block may refer to a CTU block or an NN filtering block) level switch decision of NN filtering through Rate Distortion Optimization (RDO);

c. obtaining a reconstructed picture after NN filtering.

(2) Performing the ALF filtering operation:

a. classifying the luma component, without classifying the chroma;

b. computing a new APS filter set for the luma and the chroma, respectively;

c. for the luma, making a slice/CTU-level switch decision and a filter set selection;

d. making an ALF switch decision and a filter set selection for the current slice/CTU, including: first making an ALF decision on luma; if the luma ALF is turned on after the decision, turning on the ALF of the current slice, and then making a switch decision and a filter set selection for the slice/CTU level of the chroma; if the luma ALF is turned off after the decision, turning off the ALF of the current slice, and determining by default that the chroma is in an off state, without making a switch decision and a filter set selection for the slice/CTU level of the chroma;

e. obtaining a reconstructed picture after ALF.

(3) Performing the CCALF operation, specifically: if the ALF is turned on for the current slice, performing the CCALF operation following operations of a-c, outputting a final reconstructed frame; if the ALF is turned off for the current slice, determining by default that the CCALF is in an off state, and directly outputting the result of the previous operation as the final reconstructed frame, without performing the CCALF operation.

a. calculating a CCALF filter set for chroma;

b. making a slice/CTU-level switch decision and a filter set selection;

c. obtaining a reconstructed picture after the CCALF.

According to an embodiment of the present disclosure, the decoding side performs the following operations:

(1) If the NN filtering of the SPS layer is turned on, performing NN filtering on the reconstructed picture after LMCS following the operations of a-d below; if the NN filtering of the SPS layer is turned off, performing filtering according to the legacy filtering process (DBF, SAO):

a. acquiring, from a code stream, a slice/CTU-level switch decision of the NN filtering;

b. based on the switch of the slice, if it is turned on, continuing to acquire the switch of the CTU, and moving to operation c; if it is turned off, not performing the NN filtering operation, and moving to operation d;

c. acquiring switch information of each CTU sequentially from the code stream; then, if the current CTU switch information is ON, performing an NN operation, and if it is OFF, directly outputting the reconstructed picture;

d. obtaining a reconstructed picture after the NN filtering.

(2) If the ALF filtering of the SPS layer is turned on, performing ALF processing following the operations of a-d below for the reconstructed picture obtained from (1); if it is turned off, directly outputting the reconstructed image from (1):

a. classifying: classifying luma components, without classifying the chroma;

b. acquiring the ALF switch decision of the current slice from the code stream, including: first acquiring the ALF switch information of the current slice from the code stream, where the luma supports filtering using ALF if it is turned on; then, acquiring slice-level ALF switch information of a first chroma component and a second chroma component, respectively, where the corresponding chroma component supports filtering using ALF if it is turned on; according to the ALF switch information of the current slice, if it is turned off, the slice does not support the luma ALF, chroma ALF or CCALF.

c. if the current slice supports using ALF, acquiring sequentially an ALF switch decision of each component in each CTU from the code stream. If the switch is turned on, performing an ALF operation for a component corresponding to CTU.

(3) Performing the ALF operation, to obtain a reconstructed picture:

a. acquiring a CCALF switch decision of the current slice/CTU from the code stream, specifically: if the ALF of the current slice is turned on, then: continuing to acquire the slice-level CCALF switch information of the first chroma component and the second chroma component, respectively, where the corresponding chroma component supports using CCALF for filtering; if the ALF of the current slice is turned off, determining by default that the CCALF is in an off state, not acquiring information of the CCALF;

b. if the current slice supports using CCALF, acquiring sequentially a CCALF switch decision of each component in each CTU from the code stream, specifically: if the switch is turned on, performing a CCALF filtering operation for the component corresponding to the CTU;

c. performing CCALF filtering, to obtain a reconstructed picture.

From the above contents, it can be learned that the luma ALF after the NN filtering is in an off state, and once the luma ALF is turned off, the chroma ALF and the CCALF are also forcibly turned off, probably resulting in a poor image quality after processing.

In view of the above-mentioned technical problem in the related technologies, embodiments of the present disclosure provide the solution that luma ALF and chroma ALF are separated in an ALF module after NN filtering, and even in the case of turning off the luma ALF, the chroma ALF and CCALF are still performed. Since NN filtering brings a significant improvement to luma, in many cases, the chroma ALF is in an off state after NN filtering, and if the chroma ALF is turned off, the chroma ALF and CCALF are also forcibly turned off. Accordingly, in the case of separating luma and chroma, the present disclosure can better meet the filtering requirements of chroma, thus further improving the chroma performance.

Hereinafter, with reference to embodiments, description will be made on how the present disclosure solves the above-mentioned problem in the related technologies:

The method embodiments provided in the embodiments of this application can be implemented in a computing device such as a mobile terminal, a computer terminal or the like. By means of running on a mobile terminal as an example, FIG. 3 illustrates a block diagram of a hardware structure of a mobile terminal of a method for video processing according to embodiments of the present disclosure. As shown in FIG. 3, the mobile terminal may include one or more (only one is shown in FIG. 3) processors 302 (the processor 302 may include, but is not limited to, a microprocessor MCU, a programmable logic device FPGA, or other processing device) and a memory 304 configured to store data, where the mobile terminal may also include a transmission device 306 having a communication function, and an input/output device 308. It would be appreciated by those skilled in the art that the structure as shown in FIG. 3 is provided only for illustration, without suggesting any limitation to the structure of the mobile terminal. For example, the mobile terminal may include more or fewer components than those shown in FIG. 3, or may have a different configuration from the one shown in FIG. 3.

The memory 304 can be configured to store a computer program such as a software program of an application and a module, for example, a computer program corresponding to the method for video processing according to embodiments of the present disclosure, and the processor 302 can execute various functional applications and data processing, i.e., it can implement the above-mentioned method, by running the computer program stored in the memory 304. The memory 304 may include a high speed random access memory, or may include a non-volatile memory, for example, one or more magnetic storage devices, flash memories, or other non-volatile solid-state memories. In some embodiments, the memory 304 may further include memories arranged remotely relative to the processor 302, where those remote memoires can be connected to the mobile terminal via networks. Examples of the networks include, but are not limited to, the Internet, intranets, local area networks, mobile communication networks, and combinations thereof.

The transmission device 306 is configured to receive or send data via a network. Specific examples of the networks may include wireless networks provided by communication providers of mobile terminals. In an example, the transmission device 306 includes a Network Interface Controller (NIC) which can be connected with other network devices via base stations such that it can communicate with the Internet. In an example, the transmission 306 may be a Radio Frequency (RF) module configured to communicate wirelessly with the Internet.

In the embodiment, a method for video processing is provided. FIG. 4 illustrates a flowchart I of a method for video processing according to embodiments of the present disclosure. As shown therein, the process includes operations of:

Operation S402, determining a neural network in-loop filter enabled flag of a reconstructed video unit;

Operation S404, setting, based on the neural network in-loop filter enabled flag, an adaptive loop filter enabled flag for the reconstructed video unit;

Operation S406, notifying at least one type of the following information via signaling: filter information related to neutral network in-loop filter of the reconstructed video unit, and filter information related to adaptive loop filter of the reconstructed video unit.

The above operations may be performed by a device at the video encoding side, for example, a processor, a controller, or a device having a similar processing capability.

In the embodiments described above, the determined neural network in-loop filter enabled flag may refer to a specific state of the determined neural network in-loop filter enabled flag, or a specific value of the determined neural network in-loop filter enabled flag, where different states or values correspond to different connotations. For example, when the determined neural network in-loop filter enabled flag is in an on state, or valued to 1 (which may be of other value, for example, true or the like), it is indicated that there is a need for performing neural network in-loop filter; when the determined neural network in-loop filter enabled flag is in an off state, or valued to 0 (which may be of other value, for example, false or the like), it is indicated that there is no need for performing neural network in-loop filter. Likewise, setting the adaptive loop filter enabled flag is substantially setting a state of the adaptive loop filter enabled flag, or setting a specific value of the adaptive loop filter enabled flag, where the different states or values of the adaptive loop filter enabled flag correspond to different connotations, details of which are omitted here for brevity.

In addition, the above operation of notifying the filter information related to the neural network in-loop filter of the reconstructed video unit and/or filter information related to the adaptive loop filter of the reconstructed video unit, and the operation of setting the adaptive loop filter enabled flag are not necessarily following a specific time sequence. The adaptive loop filter enabled flag may be first set, and then the filter information related to the neural network in-loop filter and/or the filter information related to the adaptive loop filter may be notified; or the filter information related to the neutral network in-loop filter and/or the filter information related to the adaptive loop filter may be first notified, and then the adaptive loop filter enabled flag is set; or, of course, the operation of setting the adaptive loop filter enabled flag and the operation of notifying the filter information related to the neutral network in-loop filter and/or the filter information related to the adaptive loop filter could be simultaneously performed.

In the embodiment, irrespective of whether the neutral network in-loop filter and adaptive loop filter are turned on or not, the operation of notifying the filter information related to the neutral network in-loop filter and/or the filter information related to the adaptive loop filter can be performed. It is worth noting that, if the filter information related to the neutral network in-loop filter and/or the filter information related to the adaptive loop filter involve(s) operation results of S402 and S404, it is required to perform S406 after S402 and S404. For the decoding side, the operations are performed likewise.

With the above embodiment, an adaptive loop filter enabled flag can be set for the reconstructed video unit based on the neural network in-loop filter enabled flag of the reconstructed video unit, thus the adaptive loop filter can be performed based on the setting result. In this way, the adaptive loop filter is prevented from being directly turned off after neural network in-loop filter, which may cause a failure to perform further luma and/or chroma processing on a picture and thus a problem that the picture quality cannot be optimal appears, and the effect of improving picture quality is achieved.

In an alternative embodiment, filter information related to the adaptive loop filter includes an adaptive loop filter enabled flag and an adaptive parameter set referenced by the adaptive loop filter. In the embodiment, the adaptive loop filter enabled flag may be determined through S404, and the adaptive parameter set referenced by the adaptive loop filter may include an APS related to chroma and/or an adaptive parameter set (APS) related to luma, where the specific computing methods and the selection strategy of the APS related to chroma and/or the APS related to luma will be described in detail in the following embodiments.

In an alternative embodiment, the adaptive loop filter enabled flag includes a luma adaptive loop filter enabled flag and a chroma adaptive loop filter enabled flag. In the embodiment, the luma adaptive loop filter enabled flag and the chroma adaptive loop filter enabled flag can be set based on the neural network in-loop filter enabled flag, respectively, i.e., whether the luma adaptive loop filter is turned on is not necessarily associated with whether the chroma adaptive loop filter is turned on. By separately setting luma and chroma, the present disclosure can better meet the filtering requirements of chroma, to thus further improve the chroma performance.

In an alternative embodiment, the chroma adaptive loop filter enabled flag includes at least one of the following: a first chroma adaptive loop filter enabled flag; a second chroma adaptive loop filter enabled flag; a first cross-component adaptive loop filter enabled flag; and a second cross-component adaptive loop filter enabled flag. In the embodiment, the chroma adaptive filter enabling flag can be further subdivided into adaptive loop filter enabled flags for multiple types of chroma, where the first chroma adaptive loop filter flag may refer to an adaptive loop filter enabled flag of a blue-difference Cb chroma component, the second chroma adaptive loop filter flag may refer to an adaptive loop filter enabled flag of a red-difference Cr chroma component, the first cross-component adaptive loop filter enabled flag may refer to a Cb CCALF filtering enabled flag, and the second cross-component adaptive loop filter enabled flag may refer to a Cr CCALF filtering enabled flag.

In an alternative embodiment, the adaptive loop filter enabled flag is notified via signaling in at least one of the following syntax elements of an encoded bitstream for generating encoded video data of the reconstructed video unit: a sequence parameter set SPS, a picture parameter set PPS, a picture header PH, a slice header SH, and a code tree unit CTU. Hereinafter, description will be provided in detail about the respective syntax elements.

According to an implementation of the present disclosure, the neural network in-loop filter enabled flag and the adaptive loop filter enabled flag are notified at the SPS level of the encoded bitstream via signaling.

Table 1 is a syntax table of the SPS level of the encoded bitstream, specifically as follows (it should be noted that, in the following tables, values of respective flags are provided only for illustration, and other types of values may be used in practice, for example, "true" and "false" are used to replace "1" and "0," or other types of characters or symbols are used to replace "1" and "0", etc.):

TABLE 1

|  | Descriptor |
|---|---|
| seq_parameter_set_rbsp( ) { | |
| ...... | |
| sps_nn_enabled_flag | u(1) |
| sps_alf_enabled_flag | u(1) |
| if( sps_alf_enabled_flag && sps_chroma_format_idc != 0 ) | |
| sps_ccalf_enabled_flag | u(1) |
| sps_lmcs_enabled_flag | u(1) |
| ...... | |
| } | |

The semantics of related syntactic fields in Table 1 is described below, where:

sps_nn_enabled_flag: an NNF filtering enabled flag of the SPS level, for indicating whether NNF is turned on at the SPS level, where 1 represents on, and 0 represents off.

sps_alf_enabled_flag: an ALF filtering enabled flag of the SPS level, for indicating whether ALF is turned on at the SPS level, where 1 represents on, and 0 represents off.

sps_ccalf_enabled_flag: an ALF filtering enabled flag of the SPS level, for indicating whether CC-ALF is turned on at the SPS level, where 1 represents on, and 0 represents off.

According to an implementation of the present disclosure, a location of filter information related to neutral network in-loop filter, and a location of filter information related to adaptive loop filter are notified at the PPS level of the encoded bitstream via signaling.

Table 2 is a syntax table of the PPS level of the encoded bitstream, specifically as follows:

TABLE 2

|  | Descriptor |
|---|---|
| pic_parameter_set_rbsp( ) { | |
| ...... | |
| pps_nnf_info_in_ph_flag | u(1) |
| pps_alf_info_in_ph_flag | u(1) |
| ...... | |
| } | |

The semantics of related syntactic fields in Table 2 is described below, where:

pps_nnf_info_in_ph_flag: indicating whether NNF filtering information is present at the PH level. When it is equal to 1, NNF filtering information is at the PH level; and when it is equal to 0, NNF filtering information is at the SH level. The decoder can determine NNF filtering enabled flags for respective components and corresponding filter information by parsing related syntactic elements in the PH level or SH level.

pps_alf_info_in_ph_flag: indicating whether ALF filtering information is present at the PH level. When it is equal to 1, ALF filtering information is at the PH level; and when it is equal to 0, ALF filtering information is at the SH level. The decoder can determine ALF filtering enabled flags for respective components and corresponding filter information by parsing related syntactic elements in the PH level or SH level.

According to an implementation of the present disclosure, filter information related to neural network in-loop filter, and filter information related to adaptive loop filter are notified at the PH level of the encoded bitstream.

Table 3 is a syntax table of the PH level of the encoded bitstream, specifically as follows:

|  | Descriptor |
|---|---|
| picture_header_structure( ) { | |
| ...... | |
| if( sps_nn_enabled_flag ){ | |
|   nn_structure( ) | |
| } | |

-continued

|  | Descriptor |
|---|---|
| if( sps_alf_enabled_flag  &&  pps_alf_info_in_ph_flag ) { | |
|   if(sps_nn_enabled_flag) | |
|     alf_split_structure( ) | |
|   else | |
|     alf_structure( ) | |
| } | |
| ...... | |
| } | |

The semantics of related syntactic fields in Table 3 is described below, where:

When pps_alf_info_in_ph_flag is equal to 1, ALF filtering information is present at the PH level. The decoder parses the alf_split_structure( ) syntactic structure or alf_structure( ) syntactic structure at the PH level to determine ALF filtering enabled flags of respective components and corresponding filter information.

According to an implementation of the present disclosure, filter information related to neutral network in-loop filter, and filter information related to adaptive loop filter are notified at the SH level of the encoded bitstream.

Table 4 is a syntax table of the SH level of the encoded bitstream, specifically as follows:

TABLE 4

|  | Descriptor |
|---|---|
| slice_header ( ) { | |
| ...... | |
| if( sps_nn_enabled_flag ){ | |
|   nn_structure( ) | |
| } | |
| if( sps_alf_enabled_flag  &&  !pps_alf_info_in_ph_flag ) { | |
|   if(sps_nn_enabled_flag) | |
|     alf_split_structure( ) | |
|   else | |
|     alf_structure( ) | |
| } | |
| ...... | |
| } | |

The semantics of related syntactic fields in Table 4 is described below, where:

When pps_alf_info_in_ph_flag is equal to 0, it represents ALF filtering information is present at the SH level. The decoder parses the alf_split_structure( ) syntactic structure or alf_structure( ) syntactic structure at the SH level to determine ALF filtering enabled flags of respective components and respective filter information.

The syntactic structure of nn_structure( ) included in the PH level or SH level (i.e., nn_structure( ) in Table 3, and nn_structure( ) in Table 4) are specifically shown in Table 5:

TABLE 5

|  | |
|---|---|
| nn_structure( ){ | |
|   nn_luma_enabled_flag | u(1) |
|   nn_cb_enabled_flag | u(1) |
|   nn_cr_enabled_flag | u(1) |
| } | |

Wherein:

The neural network in-loop filter flag in the nn_structure( ) syntactic structure includes at least one of the following:

a luma component neural network in-loop filter enabled flag (nnf_luma_enabled_flag);

a first chroma component neural network in-loop filter enabled flag (nnf_cb_enabled_flag);

a second chroma component neural network in-loop filter enabled flag (nnf_cr_enabled_flag);

nnf_luma_enabled_flag: identifying whether the current picture/slice luma component uses NN, where 1 indicates using NN, and 0 indicates not using;

nn_cb_enabled_flag: identifying whether the current picture/slice luma component uses NN, where 1 indicates using NN, and 0 indicates not using;

nn_cr_enabled_flag: identifying whether the current picture/slice luma component uses NN, where 1 indicates using NN, and 0 indicates not using.

According to an implementation of the present disclosure, in the case where an NNF filtering enabled flag (sps_nn_enabled_flag) set at an SPS level of an encoded bitstream indicates that the SPS level performs NNF filtering, an alf_split_structure( ) syntactic structure is included in a PH or SH level of the encoded bitstream for setting a luma adaptive loop filter enabled flag and a chroma adaptive loop filter enabled flag at the PH or SH level of the encoded bitstream, respectively.

The adaptive loop filter enabled flag in the alf_split_structure( ) syntactic structure includes at least one of the following:

a luma component adaptive loop filter enabled flag (alf_luma_enabled_flag);

a first chroma adaptive loop filter enabled flag (alf_cb_enabled_flag);

a second chroma adaptive loop filter enabled flag (alf_cr_enabled_flag);

a first chroma cross-component adaptive loop filter enabled flag (alf_cc_cb_enabled_flag); and a second chroma cross-component adaptive loop filter enabled flag (alf_cc_cr_enabled_flag).

The alf_split_structure( ) syntactic structure included in the PH level or SH level is specifically shown in Table 6 below:

TABLE 6

| | |
|---|---|
| alf_split_structure( ){ | |
|   alf_luma_enabled_flag | u(1) |
|   if(alf_luma_enabled_flag ) { | |
|     num_alf_aps_ids_luma | u(3) |
|     for( i = 0; i < sh_num_alf_aps_ids_luma; i++ ) | |
|       alf_aps_id_luma[ i ] | u(3) |
|   } | |
|   if( sps_chroma_format_idc  !=  0 ) { | |
|     alf_cb_enabled_flag | u(1) |
|     alf_cr_enabled_flag | u(1) |
|   } | |
|   if(alf_cb_enabled_flag  ||  alf_cr_enabled_flag ) | |
|     alf_aps_id_chroma | u(3) |
|   if( sps_ccalf_enabled_flag ) { | |
|     alf_cc_cb_enabled_flag | u(1) |
|     if(alf_cc_cb_enabled_flag ) | |
|       alf_cc_cb_aps_id | u(3) |
|     alf_cc_cr_enabled_flag | u(1) |
|     if(alf_cc_cr_enabled_flag ) | |
|       alf_cc_cr_aps_id | u(3) |
|   } | |
| } | |

The semantics of related syntactic fields in Table 6 is described below, where:

alf_luma_enabled_flag: a PH-level or SH-level luma component ALF filtering enabled flag, for indicating whether the PH or SH level turns on the luma component ALF, where 1 indicates on, and 0 indicates off.

num_alf_aps_ids_luma: identifying a number of APS filtering subsets used by luma ALF of the current picture/slice. alf_aps_id_luma[i]: identifying an ID number of the $i^{th}$ luma APS filtering subset.

alf_cb_enabled_flag: a PH-level or SH-level first chroma (i.e., Cb blue difference) component ALF filtering enabled flag, for indicating whether the PH-level or SH level turns on the first chroma (i.e., Cb blue difference) component ALF filtering, where 1 indicates on, and 0 indicates off.

alf_cr_enabled_flag: a PH-level or SH-level second chroma (i.e., Cr red difference) component ALF filtering enabled flag, for indicating whether the PH level or SH level turns on the first chroma (i.e., Cr red difference) component ALF filtering, where 1 indicates on, and 0 indicates off.

alf_aps_id_chroma: identifying an ID of an APS filter used by the current picture/slice chroma ALF.

alf_cc_cb_enabled_flag: a PH-level or SH-level first chroma cross-component (i.e., a luma for a Cb blue difference) ALF filtering enabled flag, for indicating whether the PH level or SH level turns on first chroma cross-component (i.e., the luma for the Cb blue difference) ALF filtering, where 1 indicates on, and 0 indicates off.

alf_cc_cb_aps_id: identifying a serial number of a CC-ALF filter used by the current picture/slice chroma Cb component.

alf_cc_cr_enabled_flag: a PH-level or SH-level second chroma cross-component (i.e., a luma for a Cr red difference) ALF filtering enabled flag, for indicating whether the PH level or SH level turns on second chroma cross-component (i.e., the luma for the Cr red difference) ALF filtering, where 1 indicates on, and 0 indicates off.

alf_cc_cr_aps_id: identifying a serial number of a CC-ALF filter used by the current picture/slice chroma Cr component.

According to an implementation of the present disclosure, in the case where the NNF filtering enabled flag (sps_nn_enabled_flag) set at an SPS level of an encoded bitstream indicates that the SPS level does not perform NNF filtering, the picture_header_structure ( ) and the slice_header ( ) syntactic structures defined according to the H.266/VVC standard are included in a PH level or SH level of the encoded bitstream.

According to an implementation of the present disclosure, filter information related to neural network in-loop filter and filter information related to adaptive loop filter are notified at the CTU level of the encoded bitstream via signaling.

Table 7 a syntax table of the CTU level, specifically as follows:

TABLE 7

| | Descriptor |
|---|---|
| coding_tree_unit( ) { | |
|   xCtb = CtbAddrX << CtbLog2SizeY | |
|   yCtb = CtbAddrY << CtbLog2SizeY | |
|   if( nn_luma_enabled_flag ) | |
|     nn_ctb_flag[ 0 ][ CtbAddrX ][ CtbAddrY ] | ae(v) |
|   if( nn_cb_enabled_flag ) | |
|     nn_ctb_flag[ 1 ][ CtbAddrX ][ CtbAddrY ] | ae(v) |
|   if( nn_cr_enabled_flag ) | |
|     nn_ctb_flag[ 2 ][ CtbAddrX ][ CtbAddrY ] | ae(v) |
|   if( sps_nn_enabled_flag ){ | |
|     alf_split_ctb_structure( ) | |

TABLE 7-continued

| | Descriptor |
|---|---|
| else{ | |
|     alf_ctb_structure( ) | |
| if( sh_alf_cc_cb_enabled_flag ) | |
|     alf_ctb_cc_cb_idc[ CtbAddrX ][ CtbAddrY ] | ae(v) |
| if( sh_alf_cc_cr_enabled_flag ) | ae(v) |
|     alf_ctb_cc_cr_idc[ CtbAddrX ][ CtbAddrY ] | |
| } | |

The semantics of related syntactic fields in Table 7 is described below, in which:

nn_ctb_flag[0][CtbAddrX][CtbAddrY]: identifying the CTB luma neural network in-loop filter enabled flag;

nn_ctb_flag[1][CtbAddrX][CtbAddrY]: identifying the CTB first chroma neural network in-loop filter enabled flag;

nn_ctb_flag[2][CtbAddrX][CtbAddrY]: identifying the CTB second chroma neural network in-loop filter enabled flag;

where sps_nn_enabled_flag is equivalent to the NNF filtering enabled flag of the SPS level as shown in Table 1, which is used to indicate whether the SPS level enables NNF, where 1 indicates on, and 0 indicates off.

According to an implementation of the present disclosure, in the case where an NNF filtering enabled flag (sps_nn_enabled_flag) set at an SPS level of an encoded bitstream indicates that the SPS level performs NNF filtering, an alf_split_ctb_structure( ) syntactic structure is included in a CTU level of the encoded bitstream, for setting a luma adaptive loop filter enabled flag and a chroma adaptive loop filter enabled flag at a CTB level of the encoded bitstream, respectively.

The adaptive loop filter enabled flag in the alf_split_ctb_structure( ) syntactic structure includes at least one of the following:

a luma component adaptive loop filter enabled flag (alf_luma_enabled_flag);

a first chroma adaptive loop filter enabled flag (alf_cb_enabled_flag);

a second chroma adaptive loop filter enabled flag (alf_cr_enabled_flag).

The alf_split_ctb_structure( ) syntactic structure included in the CTU level is specifically shown below in Table 8:

TABLE 8

| | Descriptor |
|---|---|
| alf_split_ctb_structure( ){ | |
|   if( alf_luma_enabled_flag ){ | |
|     alf_ctb_flag[ 0 ][ CtbAddrX ][ CtbAddrY ] | ae(v) |
|     if( alf_ctb_flag[ 0 ][ CtbAddrX ][ CtbAddrY ] ) { | |
|       if( num_alf_aps_ids_luma > 0 ) | |
|         alf_use_aps_flag | ae(v) |
|       if( alf_use_aps_flag ) { | |
|         if( num_alf_aps_ids_luma > 1 ) | |
|           alf_luma_prev_filter_idx | ae(v) |
|       } else | |
|         alf_luma_fixed_filter_idx | ae(v) |
|     } | |
|   } | |
|   if( alf_cb_enabled_flag ) { | |
|     alf_ctb_flag[ 1 ][ CtbAddrX ][ CtbAddrY ] | ae(v) |
|     if( alf_ctb_flag[ 1 ][ CtbAddrX ][ CtbAddrY ] | |
|       && alf_chroma_num_alt_filters_minus1 > 0 ) | |
|       alf_ctb_filter_alt_idx[ 0 ][ CtbAddrX ][ CtbAddrY ] | ae(v) |
|   } | |

TABLE 8-continued

| | Descriptor |
|---|---|
|   if( alf_cr_enabled_flag ) { | |
|     alf_ctb_flag[ 2 ][ CtbAddrX ][ CtbAddrY ] | ae(v) |
|     if( alf_ctb_flag[ 2 ][ CtbAddrX ][ CtbAddrY ] | |
|       && alf_chroma_num_alt_filters_minus1 > 0 ) | |
|       alf_ctb_filter_alt_idx[ 1 ][ CtbAddrX ][ CtbAddrY ] | ae(v) |
|   } | |
| } | |

The semantics of related syntactic fields in Table 8 is described below, in which:

alf_luma_enabled_flag: a CTB-level luma component ALF filtering enabled flag for indicating whether the CTB level turns on luma component ALF filtering, with 1 indicating on and 0 indicating off, where luma-related elements are introduced to fulfil the purpose of introducing a luma master switch;

alf_cb_enabled_flag: a CTB-level first chroma component ALF filtering enabled flag for indicating whether the CTB level turns on first chroma component ALF filtering, where 1 indicates on, and 0 indicates off;

alf_cr_enabled_flag: a CTB-level second chroma component ALF filtering enabled flag for indicating whether the CTB level turns on second chroma component ALF filtering, where 1 indicates on, and 0 indicates off.

In addition, in the alf_split_ctb_structure( ) syntactic structure described above:

alf_ctb_flag[0][CtbAddrX][CtbAddrY]: identifying whether the CTB uses luma ALF filtering;

alf_ctb_flag[1][CtbAddrX][CtbAddrY]: identifying whether the CTB uses first chroma ALF filtering;

alf_ctb_flag[2][CtbAddrX][CtbAddrY]: identifying whether the CTB uses second chroma ALF filtering.

According to an implementation of the present disclosure, in the case where an NNF filtering enabled flag (sps_nn_enabled_flag) set at an SPS level of an encoded bitstream indicates the SPS level does not perform NNF filtering, the CTU level of the encoded bitstream includes a coding_tree_unit( ) syntactic structure defined according to the H.266/VVC standard.

In an alternative embodiment, in the case where, at a sequence level, picture level or slice level, the neural network in-loop filter enabled flag indicates to perform neural network in-loop filter for the reconstructed video unit, a luma adaptive loop filter enabled flag and a chroma adaptive loop filter flag are set for the reconstructed video unit, respectively. In the embodiment, setting the luma adaptive loop filter enabled flag and the chroma adaptive loop filter flag is substantially setting a state of the luma adaptive loop filter enabled flag and a state of the chroma adaptive loop filter. Alternatively, if the SPS-level NN filtering is enabled, NN filtering is performed for the reconstructed picture after LMCS according to the following operations a-c. If it is turned off, filtering is performed following the legacy filtering process (DBF, SAO):

a. pre-performing NN filtering;

b. making a slice/block (a block may refer to a CTU block or an NN filtering block) level switch decision of NN filtering through RDO; and c. reconstructing the output after NN filtering.

In an alternative embodiment, the method further includes: setting a luma adaptive loop filter enabled flag and a chroma adaptive loop filter enabled flag for the reconstructed video unit, respectively, in the case where the neural network in-loop filter enabled flag indicates, at a sequence level, to perform neural network in-loop filter for the reconstructed video unit, and the adaptive loop filter enabled flag indicates, at a picture or slice level, that the luma adaptive loop filter is not performed for the reconstructed video unit. In the embodiment, setting the luma adaptive loop filter enabled flag and the chroma adaptive loop filter enabled flag is substantially setting a state of the luma adaptive loop filter enabled flag and a state of the chroma adaptive loop filter enabled flag. In the embodiment, when it is determined there is a need to perform neural network in-loop filter, and there is no need to perform luma adaptive loop filter, a chroma adaptive loop filter enabled flag update operation can be introduced. In other words, in the case, a luma adaptive loop filter enabled flag and a chroma adaptive loop filter enabled flag can be set for the reconstructed video unit, respectively, i.e., if the current SPS-level NNF filtering enabled flag is turned on, and the current PH-level/SH-level ALF filtering enabled flag is turned off, the chroma adaptive loop filter enabled flag update operation will be triggered.

Figure 6:
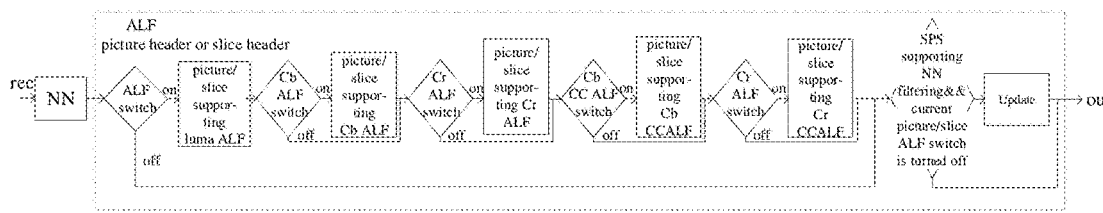
FIG. 6 illustrates an overall flowchart after an update operation is added according to embodiments of the present disclosure.
Figure 7:
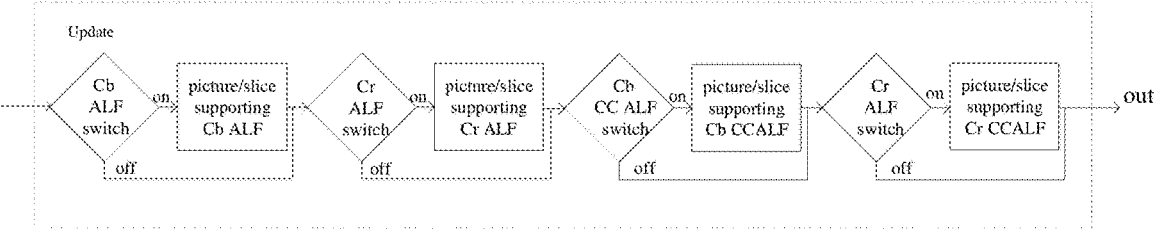
FIG. 7 illustrates a specific flowchart of an update operation according to embodiments of the present disclosure.

Description below will be made in detail about how to set a chroma adaptive loop filter enabled flag. See the update operation in FIG. 7 for details. In the embodiment, the update actually mainly includes transmitting a chorma ALF flag, the code stream transmission mode is mainly changed in the embodiment, and the encoding side is the same as the one described in the previous embodiments. However, during transmission, transmission parameters will be adaptively adjusted based on NN. See FIG. 6 for the overall process after the update operation been added. See FIG. 7 for the specific process of the update operation. In FIGS. 6 and 7, whether respective switches are turned on or not can be determined based on values of fields corresponding to respective switches. For example, when a field corresponding to a switch is valued to 1, it is determined that the switch is turned on, and when a field corresponding to a switch is valued to 0, it is determined that the switch is turned off. The switches involved in the following drawings are all operated similarly, i.e., when a field corresponding to a switch is valued to 1, it is determined that the switch is turned on, and when a field corresponding to a switch is valued to 0, it is determined that the switch is turned off. Hereinafter, details thereof will be omitted for brevity.

After the update operation is added, the syntax and semantics of the PH level, the SH level, and the CTU level will be adjusted correspondingly.

According to an implementation of the present disclosure, in the case where an NNF filtering enabled flag (sps_nn_enabled_flag) set at an SPS level of an encoded bitstream indicates that the SPS level performs NNF filtering, and an ALF filtering enabled flag (alf_enabled_flag) at a PH level or SH level of the encoded bitstream indicates that the PH level or SH level does not perform ALF filtering, the PH level or SH level of the encoded bitstream includes an alf_update_structure( ) syntactic structure, for updating a chroma adaptive loop filter enabled flag at the PH level or SH level of the encoded bitstream, i.e., a luma adaptive loop filter enabled flag and a chroma adaptive loop filter enabled flag are set respectively.

According to an implementation of the present disclosure, filter information related to neural network in-loop filter and filter information related to adaptive loop filter are notified at the PH level of the encoded bitstream via signaling. Table 9 is a picture_header_structure( ) syntactic structure table included in the PH level after the update operation is added, specifically as follows:

TABLE 9

| | Descriptor |
|---|---|
| picture_header_structure( ) {<br>  if( sps_alf_enabled_flag  &&  !pps_alf_info_in_ph_flag ) {<br>    ......<br>    if( sps_nn_enabled_flag && ! alf_enabled_flag ){<br>      alf_update_structure( ){<br>    }<br>    ......<br>  }<br>} | |

Wherein, the alf_update_structure( ) as mentioned above, is an element newly added to the PH-level syntactic structure, for updating the chroma ALF filtering enabled flag. When the existing adaptive filter enabled flag (alf_enabled_flag) in the PH-level syntactic structure is equal to 0, it is indicated to perform an update operation for the chorma adaptive loop filter enabled flag.

According to an implementation of the present disclosure, filter information related to neural network in-loop filter and filter information related to adaptive loop filter are signaled at the SH level of the encoded bitstream. Table 10 is a slice_header ( ) syntactic structure table included in the SH level after the update operation is added, specifically as follows:

TABLE 10

| | Descriptor |
|---|---|
| slice_header {<br>  if( sps_alf_enabled_flag  &&  pps_alf_info_in_ph_flag ) {<br>    ......<br>    if( sps_nn_enabled_flag && ! alf_enabled_flag ){<br>      alf_update_structure( ){<br>    }<br>    ......<br>  }<br>} | |

Wherein, the alf_update_structure( ) as mentioned above, is an element newly added to the SH-level syntactic structure, for updating the chroma ALF filtering enabled flag. When the adaptive filter enabled flag (alf_enabled_flag) in the SH-level syntactic structure is equal to 0, it is indicated to perform an update operation for the chroma adaptive loop filter enabled flag.

The alf_update_structure( ) syntactic structure included in the PH level or SH level is specifically shown below in Table 11:

TABLE 11

| | Descriptor |
|---|---|
| alf_update_structure( ){ | |
|   if( sps_chroma_format_idc   !=   0 ) { | |
|     alf_cb_enabled_flag | u(1) |
|     alf_cr_enabled_flag | u(1) |
|   } | |
|   if(alf_cb_enabled_flag   ||   alf_cr_enabled_flag ) | |
|     salf_aps_id_chroma | u(3) |
|   if( sps_ccalf_enabled_flag ) { | |
|     alf_cc_cb_enabled_flag | u(1) |
|     if(alf_cc_cb_enabled_flag ) | |
|       alf_cc_cb_aps_id | u(3) |
|     alf_cc_cr_enabled_flag | u(1) |
|     if(alf_cc_cr_enabled_flag ) | |
|       alf_cc_cr_aps_id | u(3) |
|   } | |
| } | |

According to an implementation of the present disclosure, in the case where an NNF filtering enabled flag (sps_nn_enabled_flag) set at an SPS level of an encoded bitstream indicates that the SPS level performs NNF filtering, and an ALF filtering enabled flag (alf_enabled_flag) set at a PH level or SH level of the encoded bitstream indicates that the PH level or SH level does not perform ALF filtering, an alf_update_structure( ) syntactic structure is included in a CTU level of the encoded bitstream, for updating a chroma adaptive loop filter enabled flag at the CTU level of the encoded bitstream, i.e., a luma adaptive loop filter enabled flag and a chorma adaptive loop filter enabled flag are set respectively.

Table 12 is a coding_tree_unit( ) syntactic structure table included in the CTU level after an update operation is added, specifically:

TABLE 12

| | Descriptor |
|---|---|
| coding_tree_unit( ){ | |
| if( sps_alf_enabled_flag && pps_alf_info_in_ph_flag ) { | |
| ...... | |
| if( sps_nn_enabled_flag && ! alf_enabled_flag ){ | |
| alf_update_ctb_structure( ){ | |
| ...... | |
| } | |
| } | |
| } | |

Wherein, the alf_update_ctb_structure( ), as mentioned above, is an element newly added to the CTU-level syntactic structure, for updating a chroma ALF filtering enabled flag. When the adaptive filter enabled flag (alf_enabled_flag) in the PH-level or SH-level syntactic structure is equal to 0, it is indicated to perform an update operation for the chroma adaptive loop filter enabled flag.

In an implementation of the present disclosure, filter information related to adaptive loop filter may be notified at a CTB level of an encoded bitstream via signaling, i.e., notification of the filter information related to adaptive loop filter is implemented via the related structure in the CTB level.

Wherein, the alf_update_ctb_structure( ) element included in the CTB level is used to indicate CTB-level switch information for indicating to transmit chroma ALF, and the semantics of the element is specifically shown below in Table 13:

TABLE 13

| | Descriptor |
|---|---|
| alf_update_ctb_structure( ){ | |
| if( sh_alf_cb_enabled_flag ) { | |
| alf_ctb_flag[ 1 ][ CtbAddrX ][ CtbAddrY ] | ae(v) |
| if( alf_ctb_flag[ 1 ][ CtbAddrX ][ CtbAddrY ] | |
| && alf_chroma_num_alt_filters_minus1 > 0 ) | |
| alf_ctb_filter_alt_idx[ 0 ][ CtbAddrX ][ CtbAddrY ] | ae(v) |
| } | |
| if( sh_alf_cr_enabled_flag ) { | |
| alf_ctb_flag[ 2 ][ CtbAddrX ][ CtbAddrY ] | ae(v) |
| if( alf_ctb_flag[ 2 ][ CtbAddrX ][ CtbAddrY ] | |
| && alf_chroma_num_alt_filters_minus1 > 0 ) | |
| alf_ctb_filter_alt_idx[ 1 ][ CtbAddrX ][ CtbAddrY ] | ae(v) |
| } | |
| } | |

Wherein:
alf_ctb_flag[1] is used to indicate a first chroma adaptive loop filter enabled flag of the CTB;

alf_ctb_flag[2] is used to indicate a second chroma adaptive loop filter enabled flag of the CTB;
alf_ctb_filter_alt_idx[0] is used to indicate a filter ID used in the first chroma adaptive network loop filter; and
alf_ctb_filter_alt_idx[1] is used to indicate a filter ID used in the second chroma adaptive network loop filter.

In an alternative embodiment, the method further includes: determining, based on the chroma adaptive loop filter, whether to perform chroma adaptive loop filter for the reconstructed video unit. In the embodiment, operations corresponding to different chroma adaptive loop filter enabled flags are different. When a chroma adaptive loop filter enabled flag is valued to 1, it is indicated that chroma adaptive loop filter needs to be performed for the reconstructed video unit, and when a chroma adaptive loop filter enabled flag is valued to 0, it is indicated that chroma adaptive loop filter does not need to be performed for the reconstructed video unit. Of course, the values of 1 and 0 are only provided for illustration.

Figure 9:
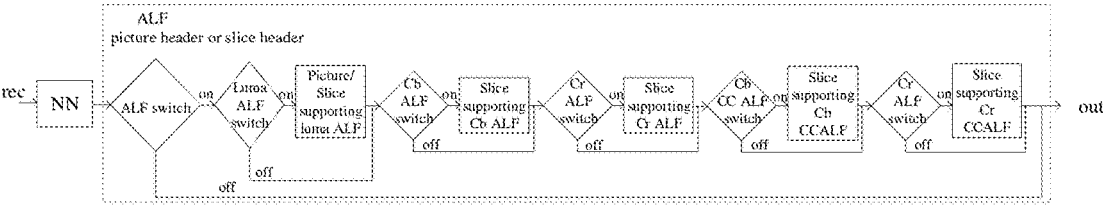
FIG. 9 illustrates a flowchart of transmission of a picture/slice layer after a luma switch is added according to embodiments of the present disclosure.

In an alternative embodiment, setting a luma adaptive loop filter enabled flag and a chroma adaptive loop filter enabled flag for the reconstructed video unit, respectively, includes: setting a first flag associated with an adaptive loop filter of a chroma component for the reconstructed video unit. In the original VVC standard, whether the luma ALF is turned on is dependent on an ALF master control switch. If the master control switch is turned on, the luma ALF is definitely enabled, and if the master control switch is turned off, the luma ALF is turned off, the chroma is also turned off. This is not reasonable. Therefore, a luma ALF switch may be added in the alf_structure( ), or a master switch may be added for chroma. The embodiment mainly changes the code stream transmission mode, and its encoding side is identical to the one described in the previous embodiments. However, during transmission, transmission parameters will be adaptively adjusted based on the NN. In the embodiment, description is mainly provided on the modified alf_structure( ) and alf_ctb_structure( ). In the embodiment, an element for representing a luma master switch may be added in the alf_structure( ), and a CTB-level element for representing a luma master switch may be added in the alf_ctb_structure( ). In the embodiment, reference may be made to FIG. 9 for the process of the transmission of the picture/slice level after a luma switch is added.

Hereinafter, description will be provided on a modified alf_structure( ) and a modified alf_ctb_structure( ) respectively.

The syntax and semantics of the modified alf_structure( ) are shown below in Table 14:

TABLE 14

| | Descriptor |
|---|---|
| alf_structure( ){ | |
| alf_enabled_flag | u(1) |
| if(alf_enabled_flag ) { | |
| alf_luma_enabled_flag | u(1) |
| if( alf_luma_enabled_flag ) { | |
| num_alf_aps_ids_luma | u(3) |
| for( i = 0; i < num_alf_aps_ids_luma; i++ ) | |
| alf_aps_id_luma[ i ] | u(3) |
| } | |
| if( sps_chroma_format_idc != 0 ) { | |
| alf_cb_enabled_flag | u(1) |
| alf_cr_enabled_flag | u(1) |
| } | |

TABLE 14-continued

| | Descriptor |
|---|---|
| if(alf_cb_enabled_flag ‖ alf_cr_enabled_flag ) | |
| alf_aps_id_chroma | u(3) |
| if( sps_ccalf_enabled_flag ) { | |
| alf_cc_cb_enabled_flag | u(1) |
| if(alf_cc_cb_enabled_flag ) | |
| alf_cc_cb_aps_id | u(3) |
| alf_cc_cr_enabled_flag | u(1) |
| if(alf_cc_cr_enabled_flag ) | |
| alf_cc_cr_aps_id | u(3) |
| } | |
| } | |
| } | |

Wherein, alf_luma_enabled_flag is a newly added luma master switch, for representing whether luma ALF is turned on, and other elements in the alf_structure( ) are consistent with those in the alf_structure( ) syntactic structure defined in the existing H.266/VVC.

The syntax and semantics of the modified alf_ctb_structure( ) are shown below in Table 15:

TABLE 15

| | Descriptor |
|---|---|
| alf_ctb_structure( ){ | |
| if(alf_luma_enabled_flag){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( sh_num_alf_aps_ids_luma > 0 ) | |
| alf_use_aps_flag | ae(v) |
| if( alf_use_aps_flag ) { | |
| if( sh_num_alf_aps_ids_luma > 1 ) | |
| alf_luma_prev_filter_idx | ae(v) |
| } else | |
| alf_luma_fixed_filter_idx | ae(v) |
| } | |
| } | |
| if( sh_alf_cb_enabled_flag ) { | |
| alf_ctb_flag[ 1 ][ CtbAddrX ][ CtbAddrY ] | ae(v) |
| if( alf_ctb_flag[ 1 ][ CtbAddrX ][ CtbAddrY ] | |
| && alf_chroma_num_alt_filters_minus1 > 0 ) | |
| alf_ctb_filter_alt_idx[ 0 ][ CtbAddrX ][ CtbAddrY ] | ae(v) |
| } | |
| if( sh_alf_cr_enabled_flag ) { | |
| alf_ctb_flag[ 2 ][ CtbAddrX ][ CtbAddrY ] | ae(v) |
| if( alf_ctb_flag[ 2 ][ CtbAddrX ][ CtbAddrY ] | |
| && alf_chroma_num_alt_filters_minus1 > 0 ) | |
| alf_ctb_filter_alt_idx[ 1 ][ CtbAddrX ][ CtbAddrY ] | ae(v) |
| } | |

Wherein, alf_luma_enabled_flag is a newly added CTB-level luma master switch.

It is worth noting that the alf_enabled_flag therein may be transmitted, or may not be transmitted. When not transmitted, alf_enabled_flag is valued in the following way:

alf_enabled_flag=alf_luma_enabled_flag‖alf_cb_enabled_flag‖alf_cr_enabled_flag‖alf_cc_cb_enabled_flag‖alf_cc_cr_enabled_flag.

In an alternative embodiment, setting a luma adaptive loop filter enabled flag and a chroma adaptive loop filter enabled flag for the reconstructed video unit, respectively, includes: setting a second flag associated with the adaptive loop filter of the chroma component for the reconstructed video unit. In the embodiment, description is mainly provided on adding a chroma master switch. In the embodiment, an element for representing a chroma master switch may be added in the alf_structure( ), and a CTB-level element for representing a chroma master switch may be added in the alf_ctb_structure( ). Reference may be made to FIG. 10 for the process of the transmission of the picture/slice layer after a chroma master switch is added. Furthermore, after the chroma master switch is added, alf_enabled_flag is only effective for luma. The syntax and semantics are shown in Tables 18-19.

Hereinafter, description will be provided on the modified alf_structure( ) and the modified alf_ctb_structure( ), respectively.

The syntax and semantics of the modified alf_structure( ) are shown below in Table 16:

TABLE 16

| | Descriptor |
|---|---|
| alf_structure( ){ | |
| alf_enabled_flag | u(1) |
| if( alf_enabled_flag ) { | |
| num_alf_aps_ids_luma | u(3) |
| for( i = 0; i < ph_num_alf_aps_ids_luma; i++ ) | |
| alf_aps_id_luma[ i ] | u(3) |
| } | |
| alf_chroma_enabled_flag | u(1) |
| if(alf_chroma_enabled_flag){ | |
| if( sps_chroma_format_idc != 0) { | |
| alf_cb_enabled_flag | u(1) |
| alf_cr_enabled_flag | u(1) |
| } | |
| if( ph_alf_cb_enabled_flag ‖ | |
| ph_alf_cr_enabled_flag ) | |
| alf_aps_id_chroma | u(3) |
| if( sps_ccalf_enabled_flag ) { | |
| alf_cc_cb_enabled_flag | u(1) |
| if(alf_cc_cb_enabled_flag ) | |
| alf_cc_cb_aps_id | u(3) |
| alf_cc_cr_enabled_flag | u(1) |
| if(alf_cc_cr_enabled_flag ) | |
| alf_cc_cr_aps_id | u(3) |
| } | |
| } | |
| } | |

Wherein, alf_chroma_enabled_flag is a newly added chroma master switch, for representing whether chroma ALF is turned on, and other elements in the alf_structure( ) are consistent with those in the alf_structure( ) syntactic structure defined in the existing H.266/VVC.

The syntax and semantics of the modified alf_ctb_structure( ) are shown below in Table 17:

TABLE 17

| | Descriptor |
|---|---|
| alf_ctb_structure( ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( sh_num_alf_aps_ids_luma > 0 ) | |
| alf_use_aps_flag | ae(v) |
| if( alf_use_aps_flag ) { | |
| if( sh_num_alf_aps_ids_luma > 1 ) | |
| alf_luma_prev_filter_idx | ae(v) |
| } else | |
| alf_luma_fixed_filter_idx | ae(v) |
| } | |
| if(alf_chroma_enabled_flag){ | |
| if( sh_alf_cb_enabled_flag ) { | |
| alf_ctb_flag[ 1 ][ CtbAddrX ][ CtbAddrY ] | ae(v) |
| if( alf_ctb_flag[ 1 ][ CtbAddrX ][ CtbAddrY ] | |
| && alf_chroma_num_alt_filters_minus1 > 0 ) | |
| alf_ctb_filter_alt_idx[ 0 ][ CtbAddrX ][ CtbAddrY ] | ae(v) |
| } | |

25

TABLE 17-continued

| | De-scriptor |
|---|---|
| if( sh_alf_cr_enabled_flag ) { | |
|    alf_ctb_flag[ 2 ][ CtbAddrX ][ CtbAddrY ] | ae(v) |
|    if( alf_ctb_flag[ 2 ][ CtbAddrX ][ CtbAddrY ] | |
|     && alf_chroma_num_alt_filters_minus1 > 0 ) | |
|     alf_ctb_filter_alt_idx[ 1 ][ CtbAddrX ][ CtbAddrY ] | ae(v) |
|    } | |
| } | |

Wherein, alf_chroma_enabled_flag is a newly added CTB-level chroma master switch.

It is to be noted that the alf_enabled_flag may be transmitted, or may not be transmitted. When it is not transmitted, alf_enabled_flag is valued in the following way:

alf_enabled_flag=alf_luma_enabled_flag||alf_cb_enabled_flag||alf_cr_enabled_flag||alf_cc_cb_enabled_flag||alf_cc_cr_enabled_flag.

In an alternative embodiment, in the case where the adaptive loop filter enabled flag is valued to a first value, the adaptive loop filter enabled flag is used to indicate to perform adaptive loop filter for the reconstructed video unit; in the case where the adaptive loop filter enabled flag is valued to a second value, the adaptive loop filter enabled flag is used to indicate not to perform adaptive loop filter for the reconstructed video unit; wherein, the first value is different from the second value. In the embodiment, the first value may be "1," "true" or others, and the second value may be "0," "false" or others.

In an alternative embodiment, performing adaptive loop filter for the reconstructed video unit comprises at least one of the following operations: performing luma adaptive loop filter for a luma component of the reconstructed video unit; performing first chroma adaptive loop filter for a first chroma component of the reconstructed video unit; performing second chroma adaptive loop filter for a second chroma component of the reconstructed video unit; performing first chroma cross-component adaptive loop filter for a first chroma component of the reconstructed video unit; and performing first chroma cross-component adaptive loop filter for a second chroma component of the reconstructed video unit. In the embodiment, the luma adaptive loop filter is Luma ALF, the first chroma adaptive loop filter is Cb ALF, the second chroma adaptive loop filter is Cr ALF, the first chroma cross-component adaptive loop filter is Cb CCALF, and the second chroma cross-component adaptive loop filter is Cr CCALF. Wherein, the first chroma component is a blue-difference (Cb) chroma component, and the second chroma component is a red-difference (Cr) chroma component.

In an alternative embodiment, in the case where the neural network in-loop filter enabled flag indicates, at a sequence level, picture level or slice level, to perform the neural network in-loop filter for the reconstructed video unit, an adaptive loop filter enabled flag is set for the reconstructed video unit based on at least one of the following decisions: a decision for performing luma adaptive loop filter for a luma component for the reconstructed video unit; a decision for performing first chroma adaptive loop filter for a first chroma component of the reconstructed video unit; a decision for performing second chroma adaptive loop filter for a second chroma component of the reconstructed video unit; a decision for performing first chroma cross-component adaptive loop filter for a first chroma component of the reconstructed video unit; and a decision for performing first chroma cross-component adaptive loop filter for a second chroma component of the reconstructed video unit. In the embodiment, if the ALF-SPLIT enabled condition is established, it is required to make filtering decisions for the luma component and the chroma component.

In an alternative embodiment, the filter information related to the neural network in-loop filter comprises a neural network in-loop filter enabled flag and an adaptive parameter set referenced by the neural network in-loop filter. In the embodiment, if the neural network in-loop filter enabled flag is in a different state, or of a different value, a different operation is performed.

In an alternative embodiment, the neural network in-loop filter enabled flag includes at least one of the following: a luma neural network in-loop filter enabled flag; a first chroma neural network in-loop filter enabled flag; and a second chroma neural network in-loop filter enabled flag. In the embodiment, the luma neural network in-loop filter enabled flag, the first chroma neural network in-loop filter enabled flag, and the second chroma neural network in-loop filter enabled flag can be determined, respectively, and then, corresponding operations are performed respectively based on the luma neural network in-loop filter enabled flag, the first chroma neural network in-loop filter enabled flag, and the second chroma neural network in-loop filter enabled flag. In the embodiment, the syntactic structure for indicating the neural network in-loop filter enabled flag is shown below in Table 18:

TABLE 18

| nn_structure( ){ | |
|---|---|
|    nn_luma_enabled_flag | u(1) |
|    nn_cb_enabled_flag | u(1) |
|    nn_cr_enabled_flag | u(1) |
| } | |

Wherein, nn_luma_enabled_flag identifies the luma neutral network in-loop filter enabled flag;

nn_cb_enabled_flag identifies the first chroma neural network in-loop filter enabled flag as mentioned above;

nn_cr_enabled_flag identifies the second chroma neural network in-loop filter enabled flag as mentioned above.

In an alternative embodiment, the neural network in-loop filter enabled flag is signaled in at least one of the following syntactic elements of an encoded bitstream for generating encoded video data of the reconstructed video unit: a sequence parameter set SPS, a picture parameter set PPS, a picture header PH, a slice header SH, and a codec tree unit CTU. The respective syntactic elements have been described in the previous embodiments, details of which are omitted here for brevity.

In an alternative embodiment, the reconstructed video unit corresponds to at least one of the following: a video picture, a video slice, a video pattern block, a slice, a codec tree unit CTU, and a codec unit CU.

The operations in the above embodiments are provided to describe operations at the encoding side.

Figure 8:
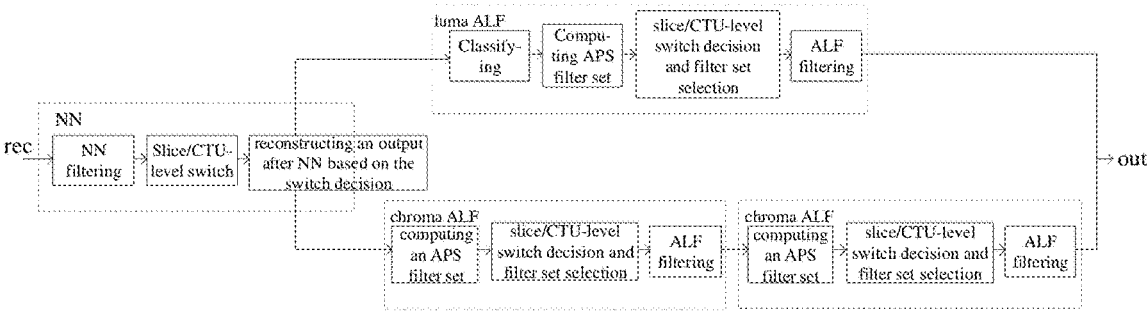
FIG. 8 illustrates a flowchart of an NN filtering-based ALF-SPLIT operation at an encoding side according to a specific embodiment of the present disclosure.

The following is an overall description of the process at the encoding side with reference to a specific embodiment. FIG. 8 illustrates a flowchart of an NN filtering-based ALF-SPLIT operation at the encoding side according to the specific embodiment, specifically including operations of:

Operation 1: NN Filtering

If the SPS layer turns on NN filtering, NN filtering is performed for the reconstructed picture after LMCS following operations of a-c. If NN filtering is turned off, filtering is performed following the legacy filtering process (DBF, SAO). Specifically, the following sub-operations a-c are included:

a. pre-performing NN filtering;

b. making a slice/block (a block may refer to a CTU block or an NN filtering block) level switch decision of NN filtering through RDO; and c. reconstructing an output after NN filtering.

Hereinafter, description will be provided in detail on respective sub-operations:

For operation 1-a: pre-performing an NN filtering operation;

NN filtering is first performed after a reconstructed picture of LMCS is obtained.

Respective items of data to be input into the network are first configured, for example, reconstructed picture samples, QP information, CU division information, de-blocking filtering information, prediction samples, and the like, and these information are input into the network module, to obtain an NN-processed sample.

For operation 1-b: slice/block-level NN filtering switch decision:

assuming that the NN filtering of a channel corresponding to the slice is in an on state, computing the cost before NN filtering and the cost after NN filtering of each block, obtaining the switch state of each block after comparison, and finally obtaining the cost for the slice to turn on the NN filtering;

assuming that the slice does not use NN filtering, obtaining the cost when the slice does not use the NN filtering;

for the respective channels of the current slice, comparing the cost before NN filtering and the cost after NN filtering, determining whether the slice-level NN filtering is turned off, and if the slices turns on NN filtering, determining whether NN filtering of each block level is turned on.

For operation 1-c: reconstructing an output after NN filtering:

obtaining the reconstructed picture after NN filtering based on slice/block-level switch decision in operation 1-b.

Operation 2: Adaptive Loop Filter (ALF)

Performing adaptive loop filter processing for the reconstructed picture according to the following below, comprising the sub-operations below:

a. classifying luma components, without classifying chroma;

b. computing a new APS filtering set for the luma and the chroma, respectively;

c. making a slice/ctu-level filtering decision of the ALF.

If the ALF-SPLIT enabled condition is established, selecting a slice/CTU-level switch decision and a filtering set for the luma and the chroma, respectively. If the ALF-SPLIT enabled condition is not established, first making a slice/CTU-level switch decision and a filtering set selection for the chroma; if the luma ALF is in an on state after selection, the ALF of the current slice is set to an on state, and then continuing to select a slice/CTU-level switch decision and a filtering set for the chroma; if the luma ALF is in an off state after selection, setting the ALF of the current slice to an off state, and the chroma ALF is in an off state by default, without making a slice/CTU-level switch decision and a filtering set selection for the chroma.

d. reconstructing an output after luma and chroma ALF.

Hereinafter, description will be provided on respective sub-operations:

For Operation 2-a: Classifying

Luma ALF Classifying:

A filter type is selected as a classification result mainly based on a content characteristic of a 4×4 pixel block. The filter type determining method for the 4×4 pixel block includes the following operations:

(1) Computing a Laplace Gradient

For each 4×4 luma block, a one-dimensional Laplace operator gradient of each pixel in an 8×8 pixel block centered on the block is computed in a horizontal direction of 0°, 90°, 135°, or 45°. In order to reduce the computing complexity, the gradient in the direction of 0°, 90°, 135°, or 45° is computed only for a part of pixels with horizontal and vertical coordinates being even or not even, to obtain $g_h$ and $g_v q$.

(2) Computing a Directional Factor D

The directional factor D embodies the gradient direction. First, a ratio of maximum and minimum gradient values in the horizontal and vertical directions, and a ratio of maximum and minimum gradient values in diagonal directions are computed based on gh and gy, and then, they are compared with thresholds t1=2, and t2=4.5, to obtain the directional factor.

(3) Computing an Activity Factor A

The activity factor A embodies the strength of the gradient, and can be obtained based on gh and gy by looking up a table.

(4) Classification Result

The classification of a 4×4 block is: filtIdx=5*D+A.

No classification is required for chroma.

For operation 2-b: Computing a New APS Filtering Set

Means for the Luma to Compute APS Filtering Set:

The basic idea of constructing an APS filter is: dividing the slice into 4×4 blocks, computing the directionality and the activity of each 4×4 block based on the gradient, and further obtaining a filter type of each block. For each filter type, all 4×4 blocks using the type of filter are considered as a whole, and a coefficient of the type of filter can be obtained using a Wiener-Hopf method.

In order to improve the algorithm performance while reducing the computing complexity, the following optimization may be performed:

(1) ALF cannot improve the compression performance for each CTU. Therefore, utilizing the utilization-distortion optimization strategy, CTUs not using ALF are determined and excluded, and the filter coefficient is recomputed. The optimization strategy can be iterated multiple times until reaching the optimal effect.

(2) The APS filtering coefficient needs to be coded for transmission, and 25 types of filters are reduced by merging, which can improve the compression efficiency. After obtaining 25 sets of filter coefficients, one set of filter coefficient is employed for adjacent filters, and if the resulted compression performance is reduced by a limited amount, the adjacent filter types are merged into one type. Such optimization strategy can be iterated multiple times until reaching the optimal effect.

Means for the Chroma to Compute APS Filter Set:

For a chroma component, the slice is divided into 8 parts, an integer number of consecutive CTUs are included in each region, and the number of CTUs in each part is substantially the same. For each region, a set of filter coefficients is computed, and 8 sets of filters are obtained in total. Then, similar to the luma component, filter sets are optimized and merged in the form of merging chroma component regions, to thus save the coded bits.

For the Operation 2-c: Slice/CTU-Level Switch Decision and Filter Set Selection

Luma Switch Decision and Filter Set Selection:

For the luma, whether an ALF operation is turned on can be selected at the slice and CTU switch level.

For luma ALF, the filter coefficient set includes 16 fixed subsets and at most 7 APS subsets, where each subset includes 25 filter types. For each CTU using the luma ALF, the selected filter subset is determined by a subset index of the codes, the selected filter type is determined by the content characteristic of the pixel block, and the specific filter set to be used is selected based on RDO.

Chroma Switch Decision and Filter Set Selection:

Also, for the chroma, whether the ALF operation is turned on can be selected at the slice and CTU switch level.

The chroma ALF only uses an APS filter subset. When the APS layer encoding and transmitting the chroma APS subset, the chroma APS subset shares the ID number with the luma information APS subset, and maintains at most 7 APS subsets. Each slice only uses one APS subset, and the Cb component and the Cr component jointly use an APS subset.

For the chroma components Cb and Cr, each APS subset includes at most 8 filters. Each CTU selects one filter therein; the Cb component and the Cr component may use filters with different indexes, and a specific filter to be used is selected based on RDO.

Moreover, reference may be made to FIG. 5 for the process of the transmission of the picture/slice layer after the chroma and luma switches are added. In FIG. 5, a luma ALF switch is mainly used to control whether to turn on the luma ALF. That is, when a field for indicating the luma ALF switch is valued to 1, on is indicated; when it is valued to 0, off is indicated. A Cb ALF switch is mainly used to control whether to turn on a first chroma component Cb ALF. That is, when a field for indicating the Cb ALF switch is valued to 1, on is indicated; when it is valued to 0, off is indicated. A Cr ALF switch is mainly used to control whether to turn on a second chroma component Cr ALF. That is, when a field for indicating the Cr ALF switch is valued to 1, on is indicated; when it is valued to 0, off is indicated. A Cb CC ALF is mainly used to control whether to turn on a first chroma component cross-component ALF. That is, when a field for indicating the Cb CC ALF switch is valued to 1, on is indicated; when it is valued to 0, off is indicated. A Cr CC ALF switch is mainly used to control whether to turn on a second chroma component cross-component ALF. That is, when a field for indicating the Cr CC ALF switch is valued to 1, on is indicated; when it is valued to 0, off is indicated.

For Operation 2-d: ALF Filtering Operation

Luma Filtering Operation:

Based on the above operations, a 7×7 filter template can be determined for each 4×4 luma block. Then, filtering is performed for each pixel in the 4×4 luma block.

Chroma Filtering Operation:

Based on the above operations, a 5×5 filtering template can be determined for each chroma CTU. Then, filtering is performed for each pixel in the chroma block in the CTU.

The luma and the chroma are merged to obtain a reconstructed frame after ALF.

Operation 3: Cross-Component Adaptive Loop Filter (CCALF)

In general, a luma component of a video contains more detailed textures while a chroma component is relatively flat. In addition, as human eyes are more sensitive to luma information, details are reserved as many as possible during video encoding. Details of the chroma component can be compensated by performing ALF for luma information, to further improve the compression performance of the chroma component. Therefore, a cross-component ALF(CC-ALF) is introduced in H.266/VVC, and the CC-ALF is performed using a reconstructed luma value before ALF filtering to supplement and correct the chroma value. An ALF filtering framework containing CC-ALF is shown in FIG. 11.

Operations at the CCALF Encoding Side are as Follows:

if the NN filtering of the SPS layer is turned on, directly performing the following operations of the CCALF: outputting a final reconstructed frame; if the NN filtering of the SPS layer is turned off, it is required to determine whether the luma ALF of the current slice is turned on, including: if it is turned on, performing the following operations of the CCALF, or if the luma ALF of the current slice is turned off, the CCALF is in an off state by default, and directly outputting a result of the previous operation as a final reconstructed frame, without performing the CCALF operation. The following sub-operations are included in detail:

a. computing a CCALF filtering set for the chroma;

b. making a slice/CTU-level switch decision and a filter set selection;

c. reconstructing an output after CCALF.

Hereinafter, description will be provided on respective sub-operations:

For Operation 3-a: Computing a CCALF Filter Set

The slice is divided into 4 parts, each region includes an integer number of consecutive CTUs respectively, and the number of CTUs in each part is substantially the same. For each region, a set of filter coefficients are computed to obtain 4 sets of filters. Then, similarly for the chroma ALF, filter sets can be optimized by merging the chroma component regions, to thus save coding bits.

For Operation 3-b: slice/CTU-level Switch Decision and Filter Set Selection

Whether a CCLF operation is turned on can be selected at the slice and CTU switch level.

CC-ALF only uses an APS filter subset. When the APS layer encoding and transmitting APS subsets of the CC-ALF, at most 7 APS subsets could be maintained. Each slice only uses one APS subset, and the Cb component and the Cr component can use different APS subsets.

In the CC-ALF, for the components Cb and Cr, each APS subset includes at most 4 filters. Each CTU selects and uses one of them. Filters with different indexes may be used for the Cb component and the Cr component, and a specific filter to be used is selected based on RDO.

For Operation 3-c: CCALF Filtering Operation

Based on the above operation, a 3×4 filtering template can be determined for each chroma CTU. Then, filtering process is performed for each pixel in a chroma block in the CTU.

It is worth noting that the filter coefficients mentioned in the above embodiments may be transmitted at the APS layer. When aps_params_type is ALF_APS, the alf_data( ) syntactic structure is parsed. alf_data( ) includes a filter set parameter of the ALF, and the decoding side can acquire the filter set parameter corresponding to the ALF by parsing alf_data( ) in the APS layer. The syntax and semantics are shown below in Table 19:

TABLE 19

| | Descriptor |
|---|---|
| adaptation_parameter_set_rbsp( ) { | |
| ...... | |
| aps_chroma_present_flag | u(1) |

TABLE 19-continued

|  | Descriptor |
|---|---|
| if(aps_params_type  = =  ALF_APS ) |  |
|   alf_data( ) |  |
|   ...... |  |
| } |  |

Wherein, the syntax and semantics of alf_data( ) are shown below in Table 20:

TABLE 20

|  | Descriptor |
|---|---|
| alf_data( ) { |  |
|   alf_luma_filter_signal_flag | u(1) |
|   if( aps_chroma_present_flag ) { |  |
|     alf_chroma_filter_signal_flag | u(1) |
|     alf_cc_cb_filter_signal_flag | u(1) |
|     alf_cc_cr_filter_signal_flag | u(1) |
|   } |  |
|   if( alf_luma_filter_signal_flag ) { |  |
|     alf_luma_clip_flag | u(1) |
|     alf_luma_num_filters_signalled_minus1 | ue(v) |
|     if( alf_luma_num_filters_signalled_minus1 > 0 ) |  |
|       for( filtIdx = 0; filtIdx < NumAlfFilters; filtIdx++ ) |  |
|         alf_luma_coeff_delta_idx[ filtIdx ] | u(v) |
|     for( sfIdx = 0; sfIdx  <=  alf_luma_num_filters_signalled_minus1; sfIdx++ ) { |  |
|       for( j = 0; j < 12; j++ ) { |  |
|         alf_luma_coeff_abs[ sfIdx ][ j ] | ue(v) |
|         if( alf_luma_coeff_abs[ sfIdx ][ j ] ) |  |
|           alf_luma_coeff_sign[ sfIdx ][ j ] | u(1) |
|       } |  |
|     if( alf_luma_clip_flag ) |  |
|       for( sfIdx = 0; sfIdx  <=  alf_luma_num_filters_signalled_minus1; sfIdx++ ) |  |
|         for(j= 0; j < 12; j++ ) |  |
|           alf_luma_clip_idx[ sfIdx ][ j ] | u(2) |
|   } |  |
|   if( alf_chroma_filter_signal_flag ) { |  |
|     alf_chroma_clip_flag | u(1) |
|     alf_chroma_num_alt_filters_minus1 | ue(v) |
|     for( altIdx = 0; altIdx  <=  alf_chroma_num_alt_filters_minus1; altIdx++ ) { |  |
|       for( j = 0; j < 6; j++ ) { |  |
|         alf_chroma_coeff_abs[ altIdx ][ j ] | ue(v) |
|         if( alf_chroma_coeff_abs[ altIdx ][ j ] > 0 ) |  |
|           alf_chroma_coeff_sign[ altIdx ][ j ] | u(1) |
|       } |  |
|       if( alf_chroma_clip_flag ) |  |
|         for( j=0; j < 6; j++ ) |  |
|           alf_chroma_clip_idx[ altIdx ][ j ] | u(2) |
|     } |  |
|   } |  |
|   if( alf_cc_cb_filter_signal_flag ) { |  |
|     alf_cc_cb_filters_signalled_minus1 | ue(v) |
|     for( k = 0; k < alf_cc_cb_filters_signalled_minus1 + 1; k++ ) { |  |
|       for( j = 0; j < 7; j++ ) { |  |
|         alf_cc_cb_mapped_coeff_abs[ k ][ j ] | u(3) |
|         if( alf_cc_cb_mapped_coeff_abs[ k ][ j ] ) |  |
|           alf_cc_cb_coeff_sign[ k ][ j ] | u(1) |
|       } |  |
|     } |  |
|   } |  |
|   if( alf_cc_cr_filter_signal_flag ) { |  |
|     alf_cc_cr_filters_signalled_minus1 | ue(v) |
|     for( k = 0; k < alf_cc_cr_filters_signalled_minus1 + 1; k++ ) { |  |
|       for( j = 0; j < 7; j++ ) { |  |
|         alf_cc_cr_mapped_coeff_abs[ k ][ j ] | u(3) |
|         if( alf_cc_cr_mapped_coeff_abs[ k ][ j ] ) |  |
|           alf_cc_cr_coeff_sign[ k ][ j ] | u(1) |
|       } |  |
|     } |  |
|   } |  |
| } |  |

Wherein:

alf_luma_filter_signal_flag: identifying whether a luma ALF filter coefficient is included, where 1 indicates yes, and 0 indicates no.

alf_chroma_filter_signal_flag: identifying whether a chroma ALF filter coefficient is included, where 1 indicates yes, and 0 indicates no.

alf_cc_cb_filter_signal_flag: identifying whether a Cb component CC-ALF filter coefficient is included, where 1 indicates yes, and 0 indicates no.

alf_cc_cr_filter_signal_flag: identifying whether a Cr component CC-ALF filter coefficient is included, where 1 indicates yes, and 0 indicates no.

alf_luma_clip_flag: identifying whether a luma clamp threshold value is included, where 1 indicates yes, and 0 indicates no. alf_luma_num_filters_signalled_minus1: identifying a number of filters included in a luma ALF subset, and adding 1 to the value.

alf_luma_coeff_delta_idx[filtIdx]: identifying a serial number of a filter used in the filteridx$^{th}$ type of the luma ALF, so that the same set of filters may be used for a plurality of filter types.

alf_luma_coeff_abs[sfIdx][j]: identifying an absolute value of the j$^{th}$ filter coefficient of the filtIdx$^{th}$ filter of the luma ALF.

alf_luma_coeff_sign[sfIdx][j]: identifying a symbol of the j$^{th}$ filter coefficient of the filtIdx$^{th}$ filter of the luma ALF.

alf_luma_clip_idx[sfIdx][j]: identifying a clamp threshold value corresponding to the j$^{th}$ filter coefficient of the filtIdx$^{th}$ filter of the luma ALF.

alf_chroma_clip_flag: identifying whether the chroma clamp threshold value is included, where 1 indicates yes, and 0 indicates no. alf_chroma_num_alt_filters_minus1: identifying a number of filters included in a chroma ALF subset, and adding 1 to the value.

alf_chroma_coeff_abs[altIdx][j]: identifying an absolute value of the j$^{th}$ filter coefficient of the altIdxth filter of the chroma ALF.

alf_chroma_coeff_sign[altIdx][j]: identifying a symbol of the j$^{th}$ filter coefficient of the altIdxth filter of the chroma ALF.

alf_chroma_clip_idx[altIdx][j]: identifying a clamp threshold value corresponding to the j$^{th}$ filter coefficient of the altIdxth filter of the chroma ALF.

alf_cc_cb_filters_signalled_minus1: identifying a number of filters included in a chroma Cb component CC-ALF subset, and adding 1 to the value.

alf_cc_cb_mapped_coeff_abs[k][j]: identifying an absolute value of the j$^{th}$ filter coefficient of the i$^{th}$ filter of the chroma Cb component CC-ALF.

alf_cc_cb_coef_sign[k][j]: identifying a symbol of the j$^{th}$ filter coefficient of the i$^{th}$ filter of the chroma Cb component CC-ALF.

alf_cc_cr_filters_signalled_minus1: identifying a number of filters included in a chroma Cr component CC-ALF subset, and adding 1 to the value.

alf_cc_cr_mapped_coeff_abs[k][j]: identifying an absolute value of the j$^{th}$ filter coefficient of the i$^{th}$ filter of the chroma Cr component CC-ALF.

alf_cc_or_coeff_sign[k][j]: identifying a symbol of the j$^{th}$ filter coefficient of the i$^{th}$ filter of the chroma Cr component CC-ALF.

Embodiments of the present disclosure further provide a method for video processing. FIG. 12 illustrates a flowchart II of a method for video processing according to embodiments of the present disclosure. As shown in FIG. 12, the process includes the following operations:

Operation S1202: receiving at least one type of the following information: filter information related to neural network in-loop filter of a reconstructed video unit, and filter information related to adaptive loop filter of the reconstructed video unit;

Operation S1204: determining a neural network in-loop filter enabled flag of the reconstructed video unit, and an adaptive loop filter enabled flag of the reconstructed video unit;

Operation S1206: performing, based on the adaptive loop filter enabled flag, adaptive loop filter for the reconstructed video unit.

The above operations may be performed by an apparatus at the video decoding side, for example, a processor, a controller, or an apparatus having a similar processing capability.

With the above embodiments, an adaptive loop filter enabled flag can be set for the reconstructed video unit based on the neural network in-loop filter enabled flag of the reconstructed video unit, thus enabling identification of an adaptive loop filter enabled flag of the reconstructed video unit based on the neural network in-loop filter enabled flag, and further performing adaptive loop filter based on the identification result. In this way, the adaptive loop filter is prevented from being directly turned off after neural network in-loop filter, which may cause a failure to perform further luma and/or chroma processing on an image and thus a problem that the picture quality cannot be optimal appears, and the effect of improving picture quality is achieved.

In an alternative embodiment, the filter information related to the adaptive loop filter comprises the adaptive loop filter enabled flag and an adaptive parameter set referenced by the adaptive loop filter.

In an alternative embodiment, the adaptive loop filter enabled flag comprises a luma adaptive loop filter enabled flag and a chroma adaptive loop filter enabled flag.

In an alternative embodiment, the chroma adaptive loop filter enabled flag comprises at least one of the following: a first chroma adaptive loop filter enabled flag; a second chroma adaptive loop filter enabled flag; a first chroma cross-component adaptive loop filter enabled flag; and a second chroma cross-component adaptive loop filter enabled flag.

In an alternative embodiment, the adaptive loop filter enabled flag is determined in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

In an alternative embodiment, the method further includes: in a case where the neural network in-loop filter enabled flag indicates, at a sequence level, picture level or slice level, that the neural network in-loop filter is performed for the reconstructed video unit, determining a luma adaptive loop filter enabled flag and a chroma adaptive loop filter enabled flag for the reconstructed video unit, respectively.

In an alternative embodiment, the method further includes: in a case where the neutral network in-loop filter enabled flag indicates, at a sequence level, to perform neural network in-loop filter for the reconstructed video unit, determining, at a picture level or slice level, a luma adaptive loop filter enabled flag for the reconstructed video unit; and in a case where the luma adaptive loop filter enabled flag indicates not to perform luma adaptive loop filter for the reconstructed video unit, determining a chroma adaptive loop filter enabled flag for the reconstructed video unit.

In an alternative embodiment, the method further includes: determining, based on the chroma adaptive loop filter enabled flag, whether to perform chroma adaptive loop filter for the reconstructed video unit.

In an alternative embodiment, determining the luma adaptive loop filter enabled flag of the reconstructed video unit includes: determining a value of a first flag of the reconstructed video unit associated with an adaptive in-loop filter of a luma component.

In an alternative embodiment, determining the chroma adaptive loop filter enabled flag of the reconstructed video unit includes: determining a value of a second flag of the reconstructed video unit associated with an adaptive in-loop filter of a chroma component.

In an alternative embodiment, in a case where the adaptive loop filter enabled flag is valued to a first value, the adaptive loop filter enabled flag is used to indicate to perform the adaptive loop filter for the reconstructed video unit; in a case where the adaptive loop filter enabled flag is valued to a second value, the adaptive loop filter enabled flag is used to indicate not to perform the adaptive loop filter for the reconstructed video unit; wherein, the first value and the second value are different.

In an alternative embodiment, performing the adaptive loop filter for the reconstructed video unit includes at least one of the following operations: performing luma adaptive loop filter for a luma component of the reconstructed video unit; performing first chroma adaptive loop filter for a first chroma component of the reconstructed video unit; performing second chroma adaptive loop filter for a second chroma component of the reconstructed video unit; performing first chroma cross-component adaptive loop filter for a first chroma component of the reconstructed video unit; and performing second chroma cross-component adaptive loop filter for a second chroma component of the reconstructed video unit.

In an alternative embodiment, the filter information related to the neural network in-loop filter comprises a neural network in-loop filter enabled flag and an adaptive parameter set referenced by the neural network in-loop filter.

In the embodiment, the APS syntactic element of the neural network in-loop filter adaptive parameter set is shown below in Table 21:

TABLE 21

| if( aps_params_type == NNF_APS ) |
| nnf_data( ) |

The field value NNF_APS of the adaptive parameter set type (aps_params_type) indicates an NN filtering adaptive parameter set. Wherein, filtering parameter information carried in nnf_data mainly includes:

a filter coefficient absolute value; and a filter coefficient symbol.

As an alternative implementation, a syntactic element related to the luma component NN filtering in the nnf_data is specifically shown below in Table 22:

TABLE 22

```
for( sfIdx = 0; sfIdx <= nn_luma_num_filters_signalled_minus1;
sfIdx++ )
    for( j = 0; j < 12; j++ ) {
        nn_luma_coeff_abs[ sfIdx ][ j ]
        if( nn_luma_coeff_abs[ sfIdx ][ j ] )
            nn_luma_coeff_sign[ sfIdx ][ j ]
    }
```

As an alternative implementation, a syntactic element related to the chroma component NN filtering in the nnf_ data is specifically shown below in Table 23:

TABLE 23

```
for( altIdx = 0; altIdx <= nn_chroma_num_filters_minus1; altIdx++
) {
    for( j = 0; j < 6; j++ ) {
        nnf_chroma_coeff_abs[ altIdx ][ j ]
        if( alf_chroma_coeff_abs[ altIdx ][ j ] > 0 )
            nnf_chroma_coeff_sign[ altIdx ][ j ]
    }
```

In an alternative embodiment, the neural network in-loop filter enabled flag comprises at least one of: a luma neural network in-loop filter enabled flag; a first chroma neural network in-loop filter enabled flag; and a second chroma neural network in-loop filter enabled flag.

In an alternative embodiment, the neural network in-loop filter enabled flag is determined in at least one of the following syntactic elements of an encoded bitstream for generating encoded video data of the reconstructed video unit:

a sequence parameter set SPS, a picture parameter set PPS, a picture header PH, a slice header SH, and a codec tree unit CTU.

In an alternative embodiment, the reconstructed video unit corresponds to at least one of the following: a video picture, a video slice, a video picture block, a slice, a codec tree unit CTU, and a codec unit CU.

The operations in the above embodiments are provided to describe the operations at the decoding side.

Hereinafter, reference will be made to specific embodiments to describe the whole process at the decoding side, specifically including the following operations:

FIG. 13 illustrates a flowchart of an NN filtering-based ALF-SPLIT operation performed at the decoding side according to specific embodiments of the present disclosure. When the ALF_SPLIT operation is applied to filtering operations at the decoding side, the main solution is shown in FIG. 13, where the luma and chroma ALF of the current slice, the slice/CTU-level switch of the CCALF, and the filter set selection are obtained by parsing a code stream. The whole process is specifically as follows:

ALF-SPLIT Enabled Condition: Turning on the NN Filtering Switch of the SPS Layer (1) After obtaining the reconstructed picture of the LMCS, if the NN filtering switch of the SPS layer is turned on, NN filtering is performed according to the following operations; if the NN filtering switch of the SPS layer is turned off, filtering is performed following the legacy filtering process.

a. Obtaining a switch decision of the slice/block level of filtering from the code stream.

b. Reconstructing, based on the switch information, an output after NN filtering.

(2) ALF processing is performed for the reconstructed picture after NN, to obtain a final reconstructed picture.

a. Classifying, including: classifying luma components, without classifying chroma.

b. Obtaining an ALF switch decision of the current slice/CTU from the code stream.

If the ALF-SPLIT enabled condition is established, switch information of the slice/CTU level of the luma and the chroma, and the corresponding filter sets are obtained from the code stream, respectively. If the ALF-SPLIT enabled condition is not established, the switch information of the current slice is obtained from the code stream, and if it is turned on, the luma ALF is set to on, slice-level switch information of the chroma is continued to be acquired, and the CTU switch information and the corresponding filter set are obtained based on the switch condition of the luma and the chroma. If the ALF of the current slice is turned off, the luma ALF is set to off, the slice switch information of the chroma is not acquired any longer, and the ALF is in an off state by default.

c. Performing an ALF filtering operation for luma and chroma (3) performing CCALF processing for the reconstructed picture after NN, and outputting the final reconstructed frame.

a. Acquiring a CCALF switch decision of the current slice/CTU from the code stream.

If the ALF-SPLIT enabled condition is established, switch information of the slice/CTU level of the current slice CCALF is directly acquired from the code stream. If the ALF-SPLIT enabled condition is not established, it is required to determine whether the slice luma ALF is turned on, if it is turned on, the switch information of the slice/CTU level of the CCALF and the corresponding filter set are further acquired from the code stream; if the ALF of the current slice is in an off state, the CCALF is in an off state by default, without making a switch decision of the slice/CTU level of the chroma or the filter set selection.

b. Performing CCALF filtering.

According to an embodiment of the present disclosure, there is further provided a solution of changing an enabled condition of ALF-SPLIT.

The ALF-SPLIT in the above-mentioned solution (see the above solution describing the process at the encoding side in entirety) is only an implementation method. The main idea of the above solution is to separate the luma and chroma ALFs after NN filtering. Considering that a large number of ALFs are turned off after NN is because that NN significantly improves the luma performance, resulting in that a large number of luma ALFs are turned off, and the luma ALFs and CCALFs are forcibly turned off as well. If NN filtering is not performed at the current picture/slice, the luma ALF is typically in an on state, without a need to perform ALF-SPLIT.

When two cases are present in the above solution, there is no need for performing the ALF-SPLIT operation:

when NN is making a filtering decision, and if the slice layer decides to turn off NN filtering; and when the NN filtering switch of the current slice is turned on, but the NN filtering switches of most of the CTUs are turned off.

Based on the two cases mentioned above, the solution of the embodiment extracts switches of ALF-SPLIT from the NN filtering module, improves adaptability of the ALF-SPLIT for NN filtering, and the following alternative implementations are proposed.

The solution of the embodiment is mainly to change the encoding side, where the decoding side is the same as the one in the above embodiments.

FIG. 14 illustrates a flowchart of an NN filtering-based ALF-SPLIT operation at the encoding side according to embodiments of the present disclosure. The whole process at the encoding side is specifically as follows:

(1) Performing NN filtering for the reconstructed picture after LMCS.

a. Performing NN filtering operation, which is identical to the operation 1-a at the encoding side in the above embodiments;

b. Making a slice/block-level NN filtering switch decision of NN, and generating a switch decision of ALF-SPLIT. Making a slice/block-level NN filtering switch decision of NN is identical to the operation 1-b at the encoding side in the above embodiments. For the switch decision of the ALF-SPLIT, there are two generating methods, and the ALF-SPLIT switch decision is written into the code stream.

① Based on the slice switch of NN, determining whether to turn on the ALF-SPLIT, specifically: if the NN filtering of the current slice is turned on, setting the ALF-SPLIT enabled condition as established; if it is turned off, setting the ALF-SPLIT enabled condition not established ② Based on the proportion of the CTU switch of NN, determining whether to turn on the ALF-SPLIT, specifically: if the current slice is in an on state, aggregating a proportion of the CTUs turned on to the total number of CTUs; if it is greater than a threshold, assumed here that the threshold is 50%, setting that the flag of ALF-SPLIT is enabled, and otherwise, setting that the flag of ALF-SPLIT is not enabled; if the NN filtering of the current slice is in a closed state, setting that the flag of the ALF-SPLIT is not enabled.

c. Reconstructing an output after NN filtering, which is identical to the operation 1-c at the encoding side in the previous embodiments.

(2) Performing an ALF filtering operation. Whether the ALF-SPLIT enabled condition is established is obtained, and other operations are identical to operation 2 at the encoding side in the previous embodiments.

(3) Performing a CCALF filtering operation. Whether the ALF-SPLIT enabled condition is established is obtained, which is identical to operation 3 at the encoding side in the previous embodiments.

Hereinafter, syntax and semantics involved in the embodiments of the present disclosure are described:

Reference will be made to FIG. 15 for the flowchart of the transmission of the picture/slice layer after the ALF-SPLIT switch is added.

The syntax and semantics in the embodiments of the present disclosure are mainly to change the ALF-SPLIT switch conditions of the PH layer, the SH layer and the CTU layer, without changing other layers. The switch information of the ALF-SPLIT is transmitted in the nn_structure( ).

The syntax and semantics of the nn_structure( ) is specifically shown below in Table 24:

TABLE 24

| nn_structure( ){ | |
| --- | --- |
|     nn_luma_enabled_flag | u(1) |
|     nn_cb_enabled_flag | u(1) |
|     nn_cr_enabled_flag | u(1) |
|     alf_split_enabled_flag | u(1) |
| } | |

Table 24 is actually formed by adding the alf_split_enabled_flag element on the basis of Table 18, where the newly added element is used to represent whether the ALF-SPLIT technology is enabled. 1 indicates enabled, and 0 indicates not enabled. If it is absent, processing is performed as the value being equal to 0.

(This syntactic element is generated based on information in NN and for example, if the proportion of the CTUs turned on and using NN filtering, as mentioned above, is greater than a threshold, it is turned on).

In the embodiments of the present disclosure, the filter information related to the neural network in-loop filter and the filter information related to the adaptive loop filter are notified at the PH layer of the encoded bitstream via signaling. The syntax and semantics at the PH layer involved in the embodiments of the present disclosure are specifically shown in Table 25:

TABLE 25

| | Descriptor |
|---|---|
| picture_header_structure( ) { | |
| ...... | |
| if( sps_nn_enabled_flag ){ | |
| nn_structure( ) | |
| } | |
| if( sps_alf_enabled_flag && | |
| pps_alf_info_in_ph_flag ) { | |
| if(alf_split_enabled_flag) | |
| alf_split_structure( ) | |
| else | |
| alf_structure( ) | |
| } | |
| ...... | |
| } | |

In Table 25, the execution prerequisite of the alf_split_structure( ) is actually adjusted on the basis of Table 3, i.e., when determining that alf_split_enabled_flag is equal to 1, performing the ALF-SPLIT operation.

In this specific embodiment, the filter information related to the neural network in-loop filter and the filter information related to the adaptive loop filter are notified at the SH level of the encoded bitstream via signaling. The syntax and semantics at the SH layer involved in the embodiments of the present disclosure are specifically shown in Table 26:

TABLE 26

| | Descriptor |
|---|---|
| picture_header_structure( ) { | |
| ...... | |
| if( sps_nn_enabled_flag ){ | |
| nn_structure( ) | |
| } | |
| if( sps_alf_enabled_flag && | |
| !pps_alf_info_in_ph_flag ) { | |
| if(alf_split_enabled_flag) | |
| alf_split_structure( ) | |
| else | |
| alf_split_structure( ) | |
| } | |
| ...... | |
| } | |

In Table 26, the execution prerequisite of the alf_split_structure( ) is actually adjusted on the basis of Table 4, i.e., when determining that alf_split_enabled_flag is equal to 1, performing the ALF-SPLIT operation.

The syntax and semantics in the CTU layer is specifically shown in Table 27:

TABLE 27

| | Descriptor |
|---|---|
| coding_tree_unit( ) { | |
| xCtb = CtbAddrX << CtbLog2SizeY | |
| yCtb = CtbAddrY << CtbLog2SizeY | |
| if( sh_sao_luma_used_flag \|\| sh_sao_chroma_used_flag ) | |
| sao( CtbAddrX, CtbAddrY ) | |
| if( sh_nn_luma_enabled_flag ) | |
| nn_ctb_flag[ 0 ][ CtbAddrX ][ CtbAddrY ] | ae(v) |
| if( sh_nn_cb_enabled_flag ) | |
| nn_ctb_flag[ 1 ][ CtbAddrX ][ CtbAddrY ] | ae(v) |
| if( sh_nn_cr_enabled_flag ) | |
| nn_ctb_flag[ 2 ][ CtbAddrX ][ CtbAddrY ] | ae(v) |
| if(alf_split_enabled_flag ){ | |
| alf_split_ctb_structure( ) | |
| else { | |
| alf_ctb_structure( ) | |
| if( sh_alf_cc_cb_enabled_flag ) | |
| alf_ctb_cc_cb_idc[ CtbAddrX ][ CtbAddrY ] | ae(v) |
| if( sh_alf_cc_cr_enabled_flag ) | | ae(v) |
| alf_ctb_cc_cr_idc[ CtbAddrX ][ CtbAddrY ] | |
| if( sh_slice_type == I && sps_qtbtt_dual_tree_intra_flag ) | |
| dual_tree_implicit_qt_split( xCtb, yCtb, CtbSizeY, 0 ) | |
| else | |
| coding_tree( xCtb, yCtb, CtbSizeY, CtbSizeY, 1, 1, 0, 0, 0, 0, 0, | |
| SINGLE_TREE, MODE_TYPE_ALL ) | |
| } | |

According to a specific embodiment of the present disclosure, an ALF-SPLIT is implemented in the case of not changing a code stream. The specific embodiment only relates to a correction at the encoding side, without changing the transmission of the code stream.

The operations at the encoding side include:

(1) Performing an NN filtering operation, which is identical to operation 1 of the solution as mentioned above (see the above solution for describing the process at the encoding side).

(2) Performing an ALF filtering operation:

a. classifying luma components without a need for classifying chroma;

b. computing a new APS filter set for luma and chroma;

c. making a slice/CTU-level filtering decision for ALF.

Then, making a slice/CTU-level switch decision and a filter set selection for the luma and chroma, respectively; if at least one of the luma and chroma is turned on after the decision, setting the ALF switch of the current slice to be turned on; if all the luma and chroma ALFs are turned off after the decision, setting the ALF switch of the current slice to be turned off.

d. reconstructing the output after the luma and chroma ALF (3) Performing a CCALF filtering operation a. computing a CCALF filter set for the chroma;

b. making a slice/CTU-level switch decision and a filter set selection for CCALF.

If the current slice turns on CCALF after the decision, updating the ALF switch of the current slice to an on state. If CCALF is turned off after the decision, keeping the ALF switch unchanged.

c. reconstructing an output after CCALF.

It is worth noting that, in the case, once the chroma ALF and CCALF are implemented, the luma ALF will transmit information.

From the description on the implementations, as provide above, those skilled in the art could clearly learn that the methods according to the above embodiments can be implemented by means of software and a necessary general-purpose hardware platform, or by means of hardware. However, in most cases, the former is an optimal implementation. Based on such an understanding, the substance of the technical solution of the present disclosure, or the part thereof making contribution over the prior art, may be embodied in the form of a software product. The computer software product is stored in a storage medium (e.g. a ROM/RAM, a magnetic disk, or a CD), including a plurality of instructions that cause a terminal device (which may be a mobile phone, a computer, a server, a network device, or the like) to execute the methods according to the embodiments of the present disclosure.

In the embodiment, there is provided an apparatus for video processing configured to implement the above embodiments and preferable implementations, details of which have been describe above. As used hereinafter, the term "module" may be a combination of software and/or hardware to implement predetermined functions. Although the apparatus described below is preferably implemented by software, an implementation by hardware or a combination of software and hardware is also possible and can be contemplated.

FIG. 16 illustrates a block diagram of a structure of an apparatus for video processing according to embodiments of the present disclosure. As shown in FIG. 16, the apparatus includes:

a determining module 162 configured to determine a neural network in-loop filter enabled flag of a reconstructed video unit;

a setting module 164 configured to set, based on the neural network in-loop filter enabled flag, an adaptive loop filter enabled flag for the reconstructed video unit; and a notifying module 166 configured to notify at least one of the following information via signaling: filter information related to neural network in-loop filter of the reconstructed video unit, and filter information related to adaptive loop filter of the reconstructed video unit.

In an alternative embodiment, the filter information related to the adaptive loop filter comprises an adaptive loop filter enabled flag and an adaptive parameter set referenced by the adaptive loop filter.

In an alternative embodiment, the chroma adaptive loop filter enabled flag comprises at least one of the following: a first chroma adaptive loop filter enabled flag; a second chroma adaptive loop filter enabled flag; a first chroma cross-component adaptive loop filter enabled flag; and a second chroma cross-component adaptive loop filter enabled flag.

In an alternative embodiment, the notifying module 166 is configured to notify, via signaling, the adaptive loop filter enabled flag in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

In an alternative embodiment, the apparatus is further configured to: in a case where the neural network in-loop filter enabled flag indicates, at a sequence level, picture level or slice level, that the neural network in-loop filter is performed for the reconstructed video unit, set a luma adaptive loop filter enabled flag and a chroma adaptive loop filter enabled flag for the reconstructed video unit, respectively.

In an alternative embodiment, the apparatus is further configured to: in a case where the neutral network in-loop filter enabled flag indicates, at a sequence level, to perform the neural network in-loop filter for the reconstructed video unit, and the adaptive loop filter enabled flag indicates, at a picture level or slice layer, not to perform luma adaptive loop filter for the reconstructed video unit, set a luma adaptive loop filter enabled flag and a chroma adaptive loop filter enabled flag for the reconstructed video unit, respectively.

In an alternative embodiment, the apparatus is further configured to: determine, based on the chroma adaptive loop filter enabled flag, whether to perform chroma adaptive loop filter for the reconstructed video unit.

In an alternative embodiment, the apparatus is configured to set the luma adaptive loop filter enabled flag and the chroma adaptive loop filter enabled flag for the reconstructed video unit, respectively, in the manner of: setting a first flag associated with an adaptive in-loop filter of a luma component for the reconstructed video unit.

In an alternative embodiment, the apparatus is configured to set the luma adaptive loop filter enabled flag and the chroma adaptive loop filter enabled flag for the reconstructed video unit, respectively, in the manner of: setting a second flag associated with an adaptive in-loop filter of a chroma component for the reconstructed video unit.

In an alternative embodiment, in a case where the adaptive loop filter enabled flag is valued to a first value, the adaptive loop filter enabled flag is used to indicate to perform the adaptive loop filter for the reconstructed video unit; in a case where the adaptive loop filter enabled flag is valued to a second value, the adaptive loop filter enabled flag is used to indicate not to perform the adaptive loop filter for the reconstructed video unit; wherein the first value and the second value are different.

In an alternative embodiment, the apparatus is configured to perform the adaptive loop filter for the reconstructed video unit in at least one of the following manners: performing luma adaptive loop filter for a luma component of the reconstructed video unit; performing first chroma adaptive loop filter for a first chroma component of the reconstructed video unit; performing second chroma adaptive loop filter for a second chroma component of the reconstructed video unit; performing first chroma cross-component adaptive loop filter for a first chroma component of the reconstructed video unit; and performing first chroma cross-component adaptive loop filter for a second chroma component of the reconstructed video unit.

In an alternative embodiment, in a case where the neural network in-loop filter enabled flag indicates, at a sequence level, picture level or slice level, to perform the neural network in-loop filter enabled flag for the reconstructed video unit, the apparatus is configured to set an adaptive loop filter enabled flag for the reconstructed video unit based on at least one of the following decisions: a decision for performing luma adaptive loop filter for a luma component for the reconstructed video unit; a decision for performing first chroma adaptive loop filter for a first chroma component of the reconstructed video unit; a decision for performing second chroma adaptive loop filter for a second chroma component of the reconstructed video unit; a decision for performing first chroma cross-component adaptive loop filter for a first chroma component of the reconstructed video unit; and a decision for performing first chroma cross-component adaptive loop filter for a second chroma component of the reconstructed video unit.

In an alternative embodiment, the filter information related to the neural network in-loop filter comprises the neural network in-loop filter enabled flag and an adaptive parameter set referenced by the neural network in-loop filter.

In an alternative embodiment, the neural network in-loop filter enabled flag comprises at least one of: a luma neural network in-loop filter enabled flag; a first chroma neural network in-loop filter enabled flag; and a second chroma neural network in-loop filter enabled flag.

In an alternative embodiment, the notifying module 166 is configured to notify, via signaling, the neural network in-loop filter enabled flag in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

In an alternative embodiment, the reconstructed video unit corresponds to at least one of the following: a video picture, a video slice, a video pattern block, a slice, a codec tree unit CTU, and a codec unit CU.

Figure 17:
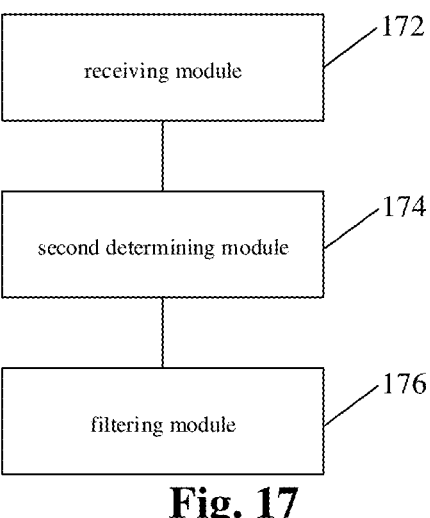
FIG. 17 illustrates a block diagram of a structure of a further apparatus for video processing according to embodiments of the present disclosure.

FIG. 17 illustrates a block diagram of a structure of a further apparatus for video processing according to embodiments of the present disclosure. As shown in FIG. 17, the apparatus includes:

a receiving module 172 configured to receive at least one of the following information: filter information related to neural network in-loop filter of a reconstructed video unit, and filter information related to adaptive loop filter of the reconstructed video unit;

a second determining module 174 configured to determine a neural network in-loop filter enabled flag of the reconstructed video unit and an adaptive loop filter enabled flag; and a filtering module 176 configured to perform, based on the adaptive loop filter enabled flag, adaptive loop filter for the reconstructed video unit.

In an alternative embodiment, the filter information related to the adaptive loop filter comprises an adaptive loop filter enabled flag and an adaptive parameter set referenced by the adaptive loop filter.

In an alternative embodiment, the chroma adaptive loop filter enabled flag comprises at least one of the following: a first chroma adaptive loop filter enabled flag; a second chroma adaptive loop filter enabled flag; a first chroma cross-component adaptive loop filter enabled flag; and a second chroma cross-component adaptive loop filter enabled flag.

In an alternative embodiment, the second determining module 174 is configured to determine the adaptive loop filter enabled flag in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

In an alternative embodiment, the apparatus is further configured to: in a case where the neural network in-loop filter enabled flag indicates, at a sequence level, picture level or slice level, to perform the neural network in-loop filter for the reconstructed video unit, determine a luma adaptive loop filter enabled flag and a chroma adaptive loop filter enabled flag for the reconstructed video unit, respectively.

In an alternative embodiment, the apparatus is further configured to: in a case where the neutral network in-loop filter enabled flag indicates, at a sequence level, to perform the neural network in-loop filter is performed for the reconstructed video unit, and the adaptive loop filter enabled flag indicates, at a picture level or slice layer, not to perform luma adaptive loop filter for the reconstructed video unit, determine a luma adaptive loop filter enabled flag and a chroma adaptive loop filter enabled flag for the reconstructed video unit, respectively.

In an alternative embodiment, the apparatus is further configured to: determine, based on the chroma adaptive loop filter enabled flag, whether to perform chroma adaptive loop filter for the reconstructed video unit.

In an alternative embodiment, the apparatus is configured to determine the luma adaptive loop filter enabled flag for the reconstructed video unit in the manner of: determining a value of a first flag of the reconstructed video unit associated with an adaptive in-loop filter of a luma component.

In an alternative embodiment, the apparatus is configured to determine the chroma adaptive loop filter enabled flag for the reconstructed video unit in the manner of: determining a value of a second flag of the reconstructed video unit associated with an adaptive in-loop filter of a chroma component.

In an alternative embodiment, in a case where the adaptive loop filter enabled flag is valued to a first value, the adaptive loop filter enabled flag is used to indicate to perform adaptive loop filter for the reconstructed video unit; and in a case where the adaptive loop filter enabled flag is valued to a second value, the adaptive loop filter enabled flag is used to indicate not to perform adaptive loop filter for the reconstructed video unit; wherein the first value and the second value are different.

In an alternative embodiment, the apparatus is configured to perform the adaptive loop filter for the reconstructed video unit in at least one of the following manners: performing luma adaptive loop filter for a luma component of the reconstructed video unit; performing first chroma adaptive loop filter for a first chroma component of the reconstructed video unit; performing second chroma adaptive loop filter for a second chroma component of the reconstructed video unit; performing first chroma cross-component adaptive loop filter for a first chroma component of the reconstructed video unit; and performing first chroma cross-component adaptive loop filter for a second chroma component of the reconstructed video unit.

In an alternative embodiment, the filter information related to the neural network in-loop filter comprises a neural network in-loop filter enabled flag and an adaptive parameter set referenced by the neural network in-loop filter.

In an alternative embodiment, the neural network in-loop filter enabled flag comprises at least one of: a luma neural network in-loop filter enabled flag; a first chroma neural network in-loop filter enabled flag; and a second chroma neural network in-loop filter enabled flag.

In an alternative embodiment, the second determining module 174 is configured to determine the neural network in-loop filter enabled flag in at least one of the following syntactic elements of an encoded bitstream for generating encoded video data of the reconstructed video unit: a sequence parameter set SPS, a picture parameter set PPS, a picture header PH, a slice header SH, and a codec tree unit CTU.

In an alternative embodiment, the reconstructed video unit corresponds to at least one of the following: a video picture, a video slice, a video pattern block, a slice, a codec tree unit CTU, and a codec unit CU.

It is to be noted that the respective modules, as described above, can be implemented by software or hardware. For the latter, it can be implemented in the following manner, but not limited to: the above modules are arranged in the same module; or the above modules can be respectively located in different processors in the form of arbitrary combination thereof.

The embodiments of the present disclosure further provide a computer readable storage medium having a computer program stored therein, where the computer program is configured to execute operations according to any one of the method embodiments, as mentioned above.

In an example embodiment, the computer readable storage medium may include, but is not limited to: various media capable of storing a computer program, for example, a U disk, a Read-Only Memory (ROM), a Random Access Memory (RAM), a portable hard disk, a magnetic disk, a CD, or the like.

Embodiments of the present disclosure further provide an electronic apparatus, comprising a memory and a processor, where the memory has a computer program stored therein, and the processor is configured to execute operations of any one of the method embodiments when running the computer program.

In an example embodiment, the electronic apparatus further includes a transmission device and an input/output device, where the transmission device is connected with the processor, and the input/output device is connected to the processor.

For the specific example in the embodiment, reference may be made to the examples described in the above-mentioned embodiments and example implementations, and details thereof are omitted here for brevity.

It will be apparent to those skilled in the art that the respective modules or operations of the present disclosure described above may be implemented by a general-purpose computing device, they may be centralized on a single computing device or distributed over a network of multiple computing devices, and alternatively, they may be implemented by program code executable by a computing device, such that they may be stored in a storage device and executed by a computing device, and in some cases, the operations shown or described may be performed in an order different than that described herein, or they may be separately fabricated into individual integrated circuit modules, or multiple modules or operations of them may be fabricated into a single integrated circuit module. Thus, the present invention is not limited to any specific combination of hardware and software.

The above described are only preferred embodiments of the present disclosure, without suggesting limitation to the present invention, and various modifications and changes may be made by those skilled in the art. Any modification, equivalent replacement, or improvement made within the spirit and principle of the present disclosure should be included in the protection scope of the present disclosure.

The invention claimed is:

1. A method for video processing, comprising:

determining a neural network in-loop filter enabled flag of a reconstructed video unit;

setting, based on the neural network in-loop filter enabled flag, an adaptive loop filter enabled flag for the reconstructed video unit; and notifying at least one of the following information via signaling: filter information related to neural network in-loop filter of the reconstructed video unit, and filter information related to adaptive loop filter of the reconstructed video unit, wherein the filter information related to the adaptive loop filter comprises the adaptive loop filter enabled flag and an adaptive parameter set referenced by the adaptive loop filter; or wherein the filter information related to the neural network in-loop filter comprises the neural network in-loop filter enabled flag and an adaptive parameter set referenced by the neural network in-loop filter; or wherein the adaptive loop filter enabled flag comprises a luma adaptive loop filter enabled flag and a chroma adaptive loop filter enabled flag.

2. The method of claim 1, wherein the chroma adaptive loop filter enabled flag comprises at least one of the following:

a first chroma adaptive loop filter enabled flag;

a second chroma adaptive loop filter enabled flag;

a first chroma cross-component adaptive loop filter enabled flag; and a second chroma cross-component adaptive loop filter enabled flag; or wherein the neural network in-loop filter enabled flag comprises at least one of:

a luma neural network in-loop filter enabled flag;

a first chroma neural network in-loop filter enabled flag; and a second chroma neural network in-loop filter enabled flag.

3. The method of claim 2, wherein the adaptive loop filter enabled flag or the neural network in-loop filter enabled flag is notified, via signaling, in at least one of the following syntactic elements of an encoded bitstream for generating encoded video data of the reconstructed video unit:

a sequence parameter set (SPS), a picture parameter set (PPS), a picture header (PH), a slice header (SH), and a codec tree unit (CTU).

4. The method of claim 1, further comprising:

in a case where the neural network in-loop filter enabled flag indicates, at a sequence level, picture level or slice level, that the neural network in-loop filter is performed for the reconstructed video unit, setting the luma adaptive loop filter enabled flag and the chroma adaptive loop filter enabled flag for the reconstructed video unit, respectively;

in a case where the neural network in-loop filter enabled flag indicates, at a sequence level, to perform the neural network in-loop filter for the reconstructed video unit, and the adaptive loop filter enabled flag indicates, at a picture level or slice layer, not to perform luma adaptive loop filter for the reconstructed video unit, setting the luma adaptive loop filter enabled flag and a chroma adaptive loop filter enabled flag for the reconstructed video unit, respectively; or determining, based on the chroma adaptive loop filter enabled flag, whether to perform chroma adaptive loop filter for the reconstructed video unit.

5. The method of claim 4, wherein setting the luma adaptive loop filter enabled flag and the chroma adaptive loop filter enabled flag for the reconstructed video unit, respectively, comprises:

setting a first flag associated with an adaptive in-loop filter of a luma component for the reconstructed video unit; or setting a second flag associated with an adaptive in-loop filter of a chroma component for the reconstructed video unit.

6. The method of claim 1, wherein:

in a case where the adaptive loop filter enabled flag is valued to a first value, the adaptive loop filter enabled flag is used to indicate to perform the adaptive loop filter for the reconstructed video unit;

in a case where the adaptive loop filter enabled flag is valued to a second value, the adaptive loop filter enabled flag is used to indicate not to perform the adaptive loop filter for the reconstructed video unit;

wherein the first value and the second value are different, wherein performing the adaptive loop filter for the reconstructed video unit comprises at least one of the following operations:

performing luma adaptive loop filter for a luma component of the reconstructed video unit;

performing first chroma adaptive loop filter for a first chroma component of the reconstructed video unit;

performing second chroma adaptive loop filter for a second chroma component of the reconstructed video unit;

performing first chroma cross-component adaptive loop filter for a first chroma component of the reconstructed video unit; and performing first chroma cross-component adaptive loop filter for a second chroma component of the reconstructed video unit.

7. The method of claim 1, wherein, in a case where the neural network in-loop filter enabled flag indicates, at a sequence level, picture level or slice level, to perform the neural network in-loop filter enabled flag for the reconstructed video unit, setting an adaptive loop filter enabled flag for the reconstructed video unit based on at least one of the following decisions:

a decision for performing luma adaptive loop filter for a luma component for the reconstructed video unit;

a decision for performing first chroma adaptive loop filter for a first chroma component of the reconstructed video unit;

a decision for performing second chroma adaptive loop filter for a second chroma component of the reconstructed video unit;

a decision for performing first chroma cross-component adaptive loop filter for a first chroma component of the reconstructed video unit;

a decision for performing first chroma cross-component adaptive loop filter for a second chroma component of the reconstructed video unit.

8. A method for video processing, comprising:

receiving at least one of the following information: filter information related to neural network in-loop filter of a reconstructed video unit, and filter information related to adaptive loop filter of the reconstructed video unit;

determining a neural network in-loop filter enabled flag of the reconstructed video unit and an adaptive loop filter enabled flag of the reconstructed video unit; and performing, based on the adaptive loop filter enabled flag, adaptive loop filter for the reconstructed video unit, wherein the filter information related to the adaptive loop filter comprises the adaptive loop filter enabled flag and an adaptive parameter set referenced by the adaptive loop filter; or wherein the filter information related to the neural network in-loop filter comprises the neural network in-loop filter enabled flag and an adaptive parameter set referenced by the neural network in-loop filter; or wherein the adaptive loop filter enabled flag comprises a luma adaptive loop filter enabled flag and a chroma adaptive loop filter enabled flag.

9. The method of claim 8, wherein the chroma adaptive loop filter enabled flag comprises at least one of the following:

a first chroma adaptive loop filter enabled flag;

a second chroma adaptive loop filter enabled flag;

a first chroma cross-component adaptive loop filter enabled flag; and a second chroma cross-component adaptive loop filter enabled flag; or wherein the neural network in-loop filter enabled flag comprises at least one of:

a luma neural network in-loop filter enabled flag;

a first chroma neural network in-loop filter enabled flag; and a second chroma neural network in-loop filter enabled flag.

10. The method of claim 8, wherein the adaptive loop filter enabled flag or the neural network in-loop filter enabled flag is determined in at least one of the following syntactic elements of an encoded bitstream for generating encoded video data of the reconstructed video unit:

a sequence parameter set (SPS), a picture parameter set (PPS), a picture header (PH), a slice header (SH), and a codec tree unit (CTU).

11. The method of claim 8, further comprising:

in a case where the neural network in-loop filter enabled flag indicates, at a sequence level, picture level or slice level, that the neural network in-loop filter is performed for the reconstructed video unit, determining the luma adaptive loop filter enabled flag and the chroma adaptive loop filter enabled flag for the reconstructed video unit, respectively;

in a case where the neural network in-loop filter enabled flag indicates, at a sequence level, to perform neural network in-loop filter for the reconstructed video unit, determining, at a picture level or slice level, the luma adaptive loop filter enabled flag;

in a case where the luma adaptive loop filter enabled flag indicates not to perform luma adaptive loop filter for the reconstructed video unit, determining a chroma adaptive loop filter enabled flag for the reconstructed video unit; or determining, based on the chroma adaptive loop filter enabled flag, whether to perform chroma adaptive loop filter for the reconstructed video unit.

12. The method of claim 11, wherein determining the luma adaptive loop filter enabled flag of the reconstructed video unit comprises:

determining a value of a first flag of the reconstructed video unit associated with an adaptive in-loop filter of a luma component; or determining a value of a second flag of the reconstructed video unit associated with an adaptive in-loop filter of a chroma component.

13. The method of claim 8, wherein:

in a case where the adaptive loop filter enabled flag is valued to a first value, the adaptive loop filter enabled flag is used to indicate to perform the adaptive loop filter for the reconstructed video unit;

in a case where the adaptive loop filter enabled flag is valued to a second value, the adaptive loop filter enabled flag is used to indicate not to perform the adaptive loop filter for the reconstructed video unit;

wherein the first value and the second value are different, wherein performing the adaptive loop filter for the reconstructed video unit preferably comprises at least one of the following operations:

performing luma adaptive loop filter for a luma component of the reconstructed video unit;

performing first chroma adaptive loop filter for a first chroma component of the reconstructed video unit;

performing second chroma adaptive loop filter for a second chroma component of the reconstructed video unit;

performing first chroma cross-component adaptive loop filter for a first chroma component of the reconstructed video unit; and performing second chroma cross-component adaptive loop filter for a second chroma component of the reconstructed video unit.

14. The method of claim 8, wherein the reconstructed video unit corresponds to at least one of the following:

a video picture, a video slice, a video picture block, a slice, a codec tree unit (CTU), and a codec unit (CU).

15. A non-transitory computer readable storage medium having a computer program stored therein, which, when executed by a processor, implements operations comprising:

determining a neural network in-loop filter enabled flag of a reconstructed video unit;

setting, based on the neural network in-loop filter enabled flag, an adaptive loop filter enabled flag for the reconstructed video unit; and notifying at least one of the following information via signaling: filter information related to neural network in-loop filter of the reconstructed video unit, and filter information related to adaptive loop filter of the reconstructed video unit, wherein the filter information related to the adaptive loop filter comprises the adaptive loop filter enabled flag and an adaptive parameter set referenced by the adaptive loop filter; or wherein the filter information related to the neural network in-loop filter comprises the neural network in-loop filter enabled flag and an adaptive parameter set referenced by the neural network in-loop filter; or wherein the adaptive loop filter enabled flag comprises a luma adaptive loop filter enabled flag and a chroma adaptive loop filter enabled flag.

16. An electronic apparatus comprising a memory, a processor, and a computer program stored on the memory and operable on the processor, the computer program, when executed by the processor, implements the method of claim 1.

17. A non-transitory computer readable storage medium having a computer program stored therein, which, when executed by a processor, implements operations comprising:

receiving at least one of the following information: filter information related to neural network in-loop filter of a reconstructed video unit, and filter information related to adaptive loop filter of the reconstructed video unit;

determining a neural network in-loop filter enabled flag of the reconstructed video unit and an adaptive loop filter enabled flag of the reconstructed video unit; and performing, based on the adaptive loop filter enabled flag, adaptive loop filter for the reconstructed video unit, wherein the filter information related to the adaptive loop filter comprises the adaptive loop filter enabled flag and an adaptive parameter set referenced by the adaptive loop filter; or wherein the filter information related to the neural network in-loop filter comprises the neural network in-loop filter enabled flag and an adaptive parameter set referenced by the neural network in-loop filter; or wherein the adaptive loop filter enabled flag comprises a luma adaptive loop filter enabled flag and a chroma adaptive loop filter enabled flag.

18. An electronic apparatus comprising a memory, a processor, and a computer program stored on the memory and operable on the processor, the computer program, when executed by the processor, implements the method of claim 8.

19. A non-transitory computer readable storage medium having bitstream stored therein, the bitstream comprising:

at least one of filter information related to neural network in-loop filter of a reconstructed video unit, and filter information related to adaptive loop filter of the reconstructed video unit, wherein the filter information related to the adaptive loop filter comprises an adaptive loop filter enabled flag for the reconstructed video unit and an adaptive parameter set referenced by the adaptive loop filter; or wherein the filter information related to the neural network in-loop filter comprises the neural network in-loop filter enabled flag for the reconstructed video unit and an adaptive parameter set referenced by the neural network in-loop filter; or wherein the adaptive loop filter enabled flag comprises a luma adaptive loop filter enabled flag and a chroma adaptive loop filter enabled flag, wherein the setting of the adaptive loop filter enabled flag is based on the neural network in-loop filter enabled flag, and the performing of adaptive loop filter for the reconstructed video unit is based on the adaptive loop filter enabled flag.

\* \* \* \* \*